US011060779B2

(12) United States Patent
Takenaka et al.

(10) Patent No.: US 11,060,779 B2
(45) Date of Patent: Jul. 13, 2021

(54) AIR-CONDITIONING SYSTEM AND AIR-CONDITIONING CONTROL METHOD

(71) Applicant: Mitsubishi Electric Corporation, Tokyo (JP)

(72) Inventors: Naofumi Takenaka, Tokyo (JP); Kimitaka Kadowaki, Tokyo (JP); Hiroki Washiyama, Tokyo (JP); Yuji Motomura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/962,368

(22) PCT Filed: Feb. 7, 2018

(86) PCT No.: PCT/JP2018/004190
§ 371 (c)(1),
(2) Date: Jul. 15, 2020

(87) PCT Pub. No.: WO2019/155548
PCT Pub. Date: Aug. 15, 2019

(65) Prior Publication Data
US 2020/0348064 A1     Nov. 5, 2020

(51) Int. Cl.
*F25B 49/02* (2006.01)
*F25B 39/00* (2006.01)
(Continued)

(52) U.S. Cl.
CPC ............ *F25B 49/022* (2013.01); *F25B 39/00* (2013.01); *F25B 41/20* (2021.01); *F25B 41/31* (2021.01);
(Continued)

(58) Field of Classification Search
CPC ................ F25B 49/022; F25B 2700/13; F25B 2700/171; F25B 2700/19; F25B 2700/21;
(Continued)

(56) References Cited

U.S. PATENT DOCUMENTS

2011/0088421 A1    4/2011   Wakamoto et al.
2011/0113802 A1*   5/2011   Wakamoto .............. F25B 13/00
                                                                                            62/196.1
(Continued)

FOREIGN PATENT DOCUMENTS

CN    107532516 A *   1/2018  ............. F01M 5/002
EP    2 282 144 A1    2/2011
(Continued)

OTHER PUBLICATIONS

International Search Report of the International Searching Authority dated Apr. 10, 2018 for the corresponding international application No. PCT/JP2018/004190 (and English translation).
(Continued)

*Primary Examiner* — Nelson J Nieves
(74) *Attorney, Agent, or Firm* — Posz Law Group, PLC

(57) ABSTRACT

An air-conditioning system includes a heat-source device that includes a compressor and a heat-source-side heat exchanger, a relay device that includes a pump and an intermediate heat exchanger, and a plurality of indoor units that each include a load-side heat exchanger. The air-conditioning system includes a refrigerant circuit through which refrigerant circulates and a heat medium circuit through which a heat medium circulates. The air-conditioning system includes a flow rate detection unit configured to detect flow rate information associated with a flow rate of a heat medium that flows through each of the plurality of indoor units and a controller configured to control the compressor and the pump. The controller controls operation (Continued)

of at least either the compressor or the pump on the basis of the flow rate information detected by the flow rate detection unit.

19 Claims, 20 Drawing Sheets

(51) Int. Cl.
   *F25B 41/20* (2021.01)
   *F25B 41/31* (2021.01)
   *F25B 41/40* (2021.01)
   *F25B 13/00* (2006.01)

(52) U.S. Cl.
   CPC .............. *F25B 41/40* (2021.01); *F25B 13/00* (2013.01); *F25B 2600/2513* (2013.01); *F25B 2600/2515* (2013.01); *F25B 2700/13* (2013.01); *F25B 2700/171* (2013.01); *F25B 2700/19* (2013.01); *F25B 2700/21* (2013.01)

(58) Field of Classification Search
   CPC ...... F25B 2600/2513; F25B 2600/2515; F25B 41/04; F25B 2313/023
   See application file for complete search history.

(56) References Cited

U.S. PATENT DOCUMENTS

| | | | |
|---|---|---|---|
| 2012/0043054 A1 | 2/2012 | Shimazu et al. | |
| 2012/0297808 A1 | 11/2012 | Honda | |
| 2014/0090409 A1* | 4/2014 | Yamashita | F25B 49/02 62/196.1 |
| 2014/0137589 A1* | 5/2014 | Motomura | F25B 7/00 62/238.7 |
| 2014/0150483 A1 | 6/2014 | Takayama et al. | |
| 2014/0238061 A1* | 8/2014 | Shimamoto | F24F 3/065 62/160 |
| 2014/0318163 A1* | 10/2014 | Takayama | F25B 13/00 62/196.1 |
| 2015/0260440 A1* | 9/2015 | Shimamoto | F25B 25/005 62/228.1 |
| 2015/0285519 A1* | 10/2015 | Motomura | F25B 25/005 62/324.1 |
| 2015/0330673 A1* | 11/2015 | Honda | F25B 25/005 62/324.1 |
| 2016/0003490 A1* | 1/2016 | Motomura | F24F 3/065 62/196.1 |
| 2016/0245539 A1* | 8/2016 | Motomura | F24F 13/30 |
| 2016/0245561 A1* | 8/2016 | Tanaka | F25B 25/005 |
| 2018/0023870 A1* | 1/2018 | Ohura | F25B 49/02 62/195 |
| 2018/0361828 A1* | 12/2018 | Kato | F25B 5/04 |
| 2018/0372385 A1* | 12/2018 | Cline | F25B 1/00 |
| 2019/0234643 A1* | 8/2019 | Yamada | F25B 31/008 |
| 2019/0323704 A1* | 10/2019 | Lee | F25B 30/06 |
| 2019/0383522 A1* | 12/2019 | Shiohama | F24F 1/00 |
| 2020/0378642 A1* | 12/2020 | Shimizu | F25B 49/02 |

FOREIGN PATENT DOCUMENTS

| | | | | |
|---|---|---|---|---|
| EP | 2312228 A1 * | 4/2011 | | F24F 5/001 |
| EP | 3 115 707 A1 | 1/2017 | | |
| JP | H07-305858 A | 11/1995 | | |
| JP | H11-173631 A | 7/1999 | | |
| JP | 2007-315695 A | 12/2007 | | |
| JP | 2010-084951 A | 4/2010 | | |
| JP | 2010-190438 A | 9/2010 | | |
| JP | 2015-64121 A | 4/2015 | | |
| JP | 2016-090178 A | 5/2016 | | |
| JP | 2016223749 A * | 12/2016 | | |
| JP | 2017-180282 A | 10/2017 | | |
| WO | 2009133640 A1 | 11/2009 | | |
| WO | 2010/131335 A1 | 11/2010 | | |
| WO | 2011/092741 A1 | 8/2011 | | |
| WO | 2013/027233 A1 | 2/2013 | | |
| WO | WO-2014128971 A1 * | 8/2014 | | F25B 49/02 |
| WO | WO-2015087421 A1 * | 6/2015 | | F25B 13/00 |
| WO | 2015/125863 A1 | 8/2015 | | |

OTHER PUBLICATIONS

Extended European Search Report dated Jan. 19, 2021 issued in corresponding European patent application No. 18904882.0.
Office Action dated Mar. 30, 2021 issued in corresponding JP patent application No. 2019-570198 (and English translation).

* cited by examiner

AIR-CONDITIONING SYSTEM AND AIR-CONDITIONING CONTROL METHOD

CROSS REFERENCE TO RELATED APPLICATION

This application is a U.S. national stage application of PCT/JP2018/004190 filed on Feb. 7, 2018, the contents of which are incorporated herein by reference.

TECHNICAL FIELD

The present disclosure relates to an air-conditioning system and an air-conditioning control method of supplying cooling energy or heating energy to a plurality of indoor units.

BACKGROUND ART

In recent years, various types of regulation have rendered reductions in amount of refrigerant compulsory, and refrigerant reduction targets have tended to become tougher every year. Under such circumstances, an air-conditioning system has been widely used in which heat generated by a heat-source device on a refrigerant circuit through which refrigerant circulates is transmitted to each indoor unit on a heat medium circuit through which a heat medium such as water circulates (see, for example, Patent Literature 1). The air-conditioning system of Patent Literature 1 adjusts the circulating pressure of a pump so that the opening degree of a flow control valve provided at an inlet of the indoor unit reaches an upper limit value.

CITATION LIST

Patent Literature

Patent Literature 1: Japanese Unexamined Patent Application Publication No. 2007-315695

SUMMARY OF INVENTION

Technical Problem

However, the opening degree of the flow control valve may be set irrespective of a system configuration that includes a pipe length, a pressure loss, the capacity of each indoor unit, or other attributes. This configuration brings about a decrease in accuracy of control in the whole system and reduces operating efficiency, and it is thus undesirably impossible to achieve energy saving.

The present disclosure has been made to solve a problem such as the problem described above and has as an object to provide an air-conditioning system and an air-conditioning control method that bring about improvement in accuracy of control in the whole system.

Solution to Problem

An air-conditioning system according to one embodiment of the present disclosure includes a heat-source device that includes a compressor and a heat-source-side heat exchanger; a relay device that includes a pump and an intermediate heat exchanger; a plurality of indoor units that each include a load-side heat exchanger; a refrigerant circuit, formed by the compressor, the heat-source-side heat exchanger, and the intermediate heat exchanger that are connected to one another via a refrigerant pipe, through which refrigerant circulates; a heat medium circuit, formed by the pump, the intermediate heat exchanger, and the load-side heat exchanger of each of the plurality of indoor units that are connected to one another via a heat medium pipe, through which a heat medium circulates; a flow rate detection unit configured to detect flow rate information associated with a flow rate of a heat medium that flows through each of the plurality of indoor units; and a controller configured to control operation of at least either the compressor or the pump on the basis of the flow rate information detected by the flow rate detection unit.

An air-conditioning control method according to another embodiment of the present disclosure is an air-conditioning control method of an air-conditioning system that includes a refrigerant circuit, formed by a compressor, a heat-source-side heat exchanger, and an intermediate heat exchanger that are connected to one another via a refrigerant pipe, through which refrigerant circulates and a heat medium circuit, formed by a pump, the intermediate heat exchanger, and a plurality of load-side heat exchangers that are connected to one another via a heat medium pipe, through which a heat medium circulates. The air-conditioning control method includes a flow rate detecting step of detecting flow rate information associated with a flow rate of a heat medium that flows through each of the plurality of load-side heat exchangers, and a controlling step of controlling operation of at least either the compressor or the pump on the basis of the flow rate information detected in the flow rate detecting step.

Advantageous Effects of Invention

According to an embodiment of the present disclosure, the operation of at least either the compressor or the pump is controlled on the basis of the flow rate information that is varied by a system configuration, Consequently, it is possible to enhance the accuracy of control in the whole system, and it is thus possible to achieve energy saving.

DESCRIPTION OF EMBODIMENTS

Embodiment 1

Figure 1:
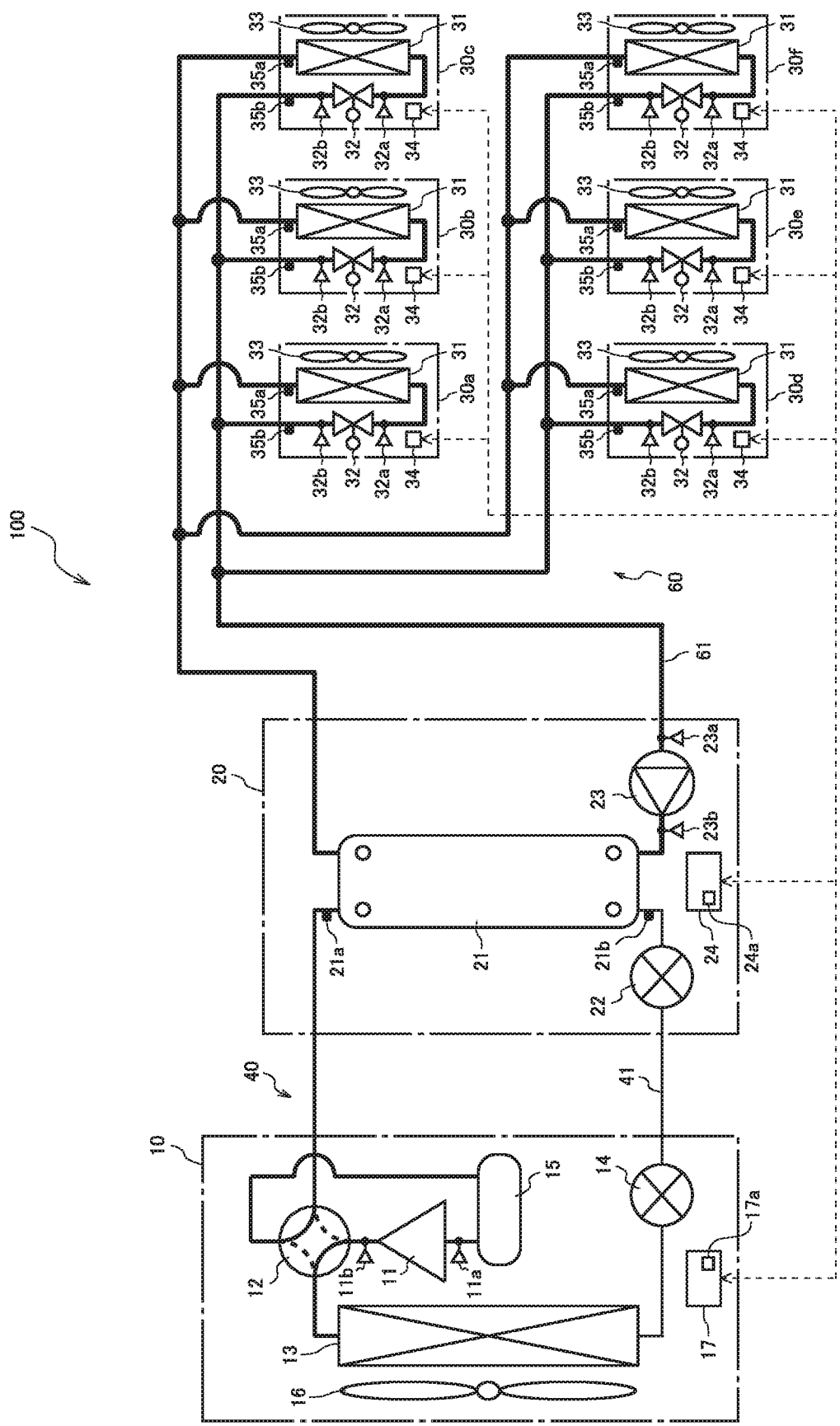
FIG. 1 is a circuit diagram illustrating a configuration of an air-conditioning system according to Embodiment 1 of the present disclosure.

FIG. 1 is a circuit diagram illustrating a configuration of an air-conditioning system according to Embodiment 1 of the present disclosure. As shown in FIG. 1, the air-conditioning system 100 includes a heat-source device 10, a relay device 20, and a plurality of indoor units 30a to 30f. FIG. 1 illustrates a case where the air-conditioning system 100 includes six indoor units 30a to 30f. The plurality of indoor units 30a to 30f may all be of the same capacity or may be a mixture of indoor units of different capacities.

The heat-source device 10 supplies cooling energy or heating energy to each of the indoor units 30a to 30f via the relay device 20. The heat-source device 10 includes a compressor 11, a four-way valve 12, a heat-source-side heat exchanger 13, a heat-source-side expansion device 14, and an accumulator 15. The relay device 20 includes an intermediate heat exchanger 21, a relaying expansion device 22, and a pump 23. Each of the indoor units 30a to 30f includes a load-side heat exchanger 31 and a flow control valve 32.

That is, in the air-conditioning system 100, the compressor 11, the four-way valve 12, the heat-source-side heat exchanger 13, the heat-source-side expansion device 14, the relaying expansion device 22, the intermediate heat exchanger 21, and the accumulator 15 are connected to one another via a refrigerant pipe 41 to form a refrigerant circuit 40 through which refrigerant circulates. That is, the heat-source device 10 and the relay device 20 are connected to each other by the refrigerant pipe 41.

Note here that usable examples of the refrigerant that circulates through the refrigerant circuit 40 include single-component refrigerants such as R-22 and R-134a, near-azeotropic refrigerant mixtures such as R-410A and R-404A, and non-azeotropic refrigerant mixtures such as R-407C. It is of course possible to use, as the refrigerant that circulates through the refrigerant circuit 40, a refrigerant, such as $CF_3CF=CH_2$, whose chemical formula includes a double bond and whose global warming potential is comparatively small, a mixture of such refrigerants, or a natural refrigerant such as $CO_2$ and propane.

Further, in the air-conditioning system 100, the pump 23, the intermediate heat exchanger 21, and the load-side heat exchanger 31 and flow control valve 32 of each of the indoor units 30a to 30f are connected to one another via a heat medium pipe 61 to form a heat medium circuit 60 through which a heat medium circulates. That is, the relay device 20 and each of the indoor units 30a to 30f are connected to each other by the heat medium pipe 61. Note here that usable examples of the heat medium is water, brine, or other heat media.

The heat-source device 10 includes a heat-source-side fan 16 and a heat-source-side controller 17. The relay device 20 includes a relaying controller 24. Each of the indoor units 30a to 30f includes a load-side fan 33 and a load-side controller 34. The heat-source-side fan 16 sends outside air to the heat-source-side heat exchanger 13. The load-side fan 33 sends indoor air to the load-side heat exchanger 31.

The heat-source-side controller 17 controls operation of the compressor 11, the four-way valve 12, and the heat-source-side expansion device 14. The heat-source-side controller 17 includes a memory 17a that stores data for use in various types of computation or other data. The heat-source-side controller 17 is configured to perform data communication with the relaying controller 24 of the relay device 20 and the load-side controller 34 of each of the indoor units 30a to 30f.

In each of the indoor units 30a to 30f, the load-side controller 34 controls the opening degree of the flow control valve 32, for example, on the basis of the difference between the indoor temperature and the target temperature. In Embodiment 1, the load-side controller 34 is configured to exercise PID control for the opening degree of the flow control valve on the basis of an amount of change in the difference between a measured value of the indoor temperature and a set value of the indoor temperature. The load-side controller 34 of each of the indoor units 30a to 30f is configured to perform data communication with the heat-source-side controller 17 of the heat-source device 10 and the relaying controller 24 of the relay device 20. In each of the indoor units 30a to 30f, the load-side controller 34 for example outputs, to the relaying controller 24, an opening degree value that is information on the opening degree of the flow control valve 32.

The relaying controller 24 controls operation of the relaying expansion device 22 and the pump 23. In addition, the relaying controller 24 is configured to control operation of the compressor 11 and the heat-source-side expansion device 14 via the heat-source-side controller 17. In Embodiment 1, the relaying controller 24 is configured to exercise energy-saving control to control the operation of the compressor 11 and the pump 23 in cooperation with the heat-source-side controller 17 and each load-side controller 34 on the basis of flow rate information. That is, the relaying controller 24 is configured to exercise overall control of the air-conditioning system 100. The relaying controller 24 includes a memory 24a that stores data for use in various types of computation or other data. The relaying controller 24 is configured to perform data communication with the heat-source-side controller 17 of the heat-source device 10 and the load-side controller 34 of each of the indoor units 30a to 30f.

The compressor 11 includes a compressor motor (not illustrated) that is driven, for example, by an inverter, and suctions and compresses refrigerant. The four-way valve 12, connected to the compressor 11, is controlled by the heat-source-side controller 17 to switch the flows of refrigerant. During cooling operation in which cooling energy is supplied to each of the indoor units 30a to 30f, the four-way valve 12 forms flow passages indicated by solid lines in FIG. 1, On the other hand, during heating operation in which heating energy is supplied to each of the indoor units 30a to 30f, the four-way valve 12 forms flow passages indicated by dotted lines in FIG. 1.

The heat-source-side heat exchanger 13 is, for example, a fin-and-tube heat exchanger and exchanges heat between refrigerant flowing through the refrigerant circuit 40 and the outside air. The heat-source-side heat exchanger 13 is used as a condenser during cooling operation, that is, when the heat-source device 10 is used as a supply source of cooling energy. On the other hand, the heat-source-side heat exchanger 13 is used as an evaporator during heating operation, that is, when the heat-source device 10 is used as a supply source of heating energy. The heat-source-side expansion device 14 is, for example, an electronic expansion valve and expands refrigerant under reduced pressure. The heat-source-side expansion device 14 is provided downstream of the heat-source-side heat exchanger 13 during cooling operation. The heat-source-side expansion device 14 is controlled by the heat-source-side controller 17 during cooling operation to generate two-phase refrigerant by reducing the pressure of high-pressure refrigerant that flows in from the heat-source-side heat exchanger 13. The accumulator 15 is provided upstream of the compressor 11 and controls the inflow of liquid refrigerant into the compressor 11 by retaining excessive refrigerant.

The intermediate heat exchanger 21 is, for example, a plate heat exchanger and is connected between the refrigerant circuit 40 and the heat medium circuit 60. The intermediate heat exchanger 21 exchanges heat between refrigerant circulating through the refrigerant circuit 40 and a heat medium circulating through the heat medium circuit 60. The intermediate heat exchanger 21 is used as an evaporator during cooling operation and is used as a condenser during heating operation. The relaying expansion device 22 is, for example, an electronic expansion valve and expands refrigerant under reduced pressure. The relaying expansion device 22 is provided between the heat-source-side heat exchanger 13 and the intermediate heat exchanger 21 in the refrigerant circuit 40. In Embodiment 1, the heat-source-side expansion device 14 is interposed between the heat-source-side heat exchanger 13 and the relaying expansion device 22. The relaying expansion device 22 is provided downstream of the intermediate heat exchanger 21 during heating operation. The relaying expansion device 22 is controlled by the relaying controller 24 during heating operation to generate two-phase refrigerant by reducing the pressure of high-pressure refrigerant that flows in from the intermediate heat exchanger 21.

The pump 23 includes a motor (not illustrated) that is driven, for example, by an inverter, is driven by the motor used as a power source, and circulates a heat medium in the heat medium circuit 60. That is, the pump 23 is controlled by the relaying controller 24 and applies a pressure to circulate a heat medium in the heat medium circuit 60.

The load-side heat exchanger 31 is, for example, a fin-and-tube heat exchanger and exchanges heat between a heat medium flowing through the heat medium circuit 60 and the indoor air. The flow control valve 32 is, for example, an electronic expansion valve and adjusts the flow rate of a heat medium that flows into the load-side heat exchanger 31. That is, the flow control valve 32 is configured to effect continuous changes in flow passage resistance by being controlled from an indoor controller. The flow control valve 32 is preferably provided downstream of the load-side heat exchanger 31 to prevent a heat medium, for example, from rejecting heat before the heat medium flows into the load-side heat exchanger 31.

The heat-source device 10 is provided with a suction pressure sensor 11a and a discharge pressure sensor 11b. The suction pressure sensor 11a is provided to a suction port of the compressor 11 and measures a suction pressure Ps that is the pressure of refrigerant that is suctioned into the compressor 11. The discharge pressure sensor 11b is provided to a discharge port of the compressor 11 and measures a discharge pressure Pd that is the pressure of refrigerant that is discharged from the compressor 11. The suction pressure sensor 11a and the discharge pressure sensor 11b each output measured data to the heat-source-side controller 17.

The relay device 20 is provided with a first temperature sensor 21a and a second temperature sensor 21b. The first temperature sensor 21a measures a first temperature that is the temperature of refrigerant that flows between the intermediate heat exchanger 21 and the compressor 11. In Embodiment 1, the first temperature sensor 21a is provided between the intermediate heat exchanger 21 and the four-way valve 12 in the relay device 20. The second temperature sensor 21b is provided between the intermediate heat exchanger 21 and the relaying expansion device 22 and measures a second temperature that is the temperature of refrigerant that flows between the intermediate heat exchanger 21 and the relaying expansion device 22.

The first temperature sensor 21a is provided downstream of the intermediate heat exchanger 21 during cooling operation. The second temperature sensor 21b is provided downstream of the intermediate heat exchanger 21 during heating operation. The first temperature sensor 21a and the second temperature sensor 21b each output measured data to the relaying controller 24.

Further, the relay device 20 is provided with a pump inlet pressure sensor 23a and a pump outlet pressure sensor 23b. The pump inlet pressure sensor 23a is provided upstream of the pump 23 and measures a pump inlet pressure that is a pressure at an inlet of the pump 23. The pump outlet pressure sensor 23b is provided downstream of the pump 23 and measures a pump outlet pressure that is a pressure at an outlet of the pump 23.

The air-conditioning system 100 includes a flow rate detection unit 320 (see FIG. 2) that detects flow rate information associated with the flow rate of a heat medium that flows through each of the plurality of indoor units 30a to 30f. In Embodiment 1, each of the indoor units 30a to 30f is provided with a valve inlet pressure sensor 32a and a valve outlet pressure sensor 32b that form the flow rate detection unit 320. The valve inlet pressure sensor 32a is provided upstream of the flow control valve 32 and measures a valve inlet pressure that is a pressure at an inlet of the flow control valve 32. The valve outlet pressure sensor 32b is provided downstream of the flow control valve 32 and measures a valve outlet pressure that is a pressure at an outlet of the flow control valve 32.

Note here that the air-conditioning system 100 is configured to calculate, using a differential pressure between the valve inlet pressure and the valve outlet pressure and a Cv value that represents the features of the flow control valve 32, the flow rate of a heat medium that flows through each of the plurality of indoor units 30a to 30f. The Cv value is a value that is determined by the type and port diameter of the flow control valve 32 and is a capacity coefficient of the flow control valve 32, That is, the Cv value is a numerical representation of the flow rate of a fluid that passes through the flow control valve 32 under a certain differential pressure. That is, in Embodiment 1, the valve inlet pressure and the valve outlet pressure correspond to the flow rate information.

Further, each of the plurality of indoor units 30a to 30f is provided with an inflow temperature sensor 35a and an outflow temperature sensor 35b. The inflow temperature sensor 35a measures an inflow temperature that is the temperature of a heat medium that flows into the indoor unit. The outflow temperature sensor 35b measures an outflow temperature that is the temperature of a heat medium that flows out from the indoor unit. FIG. 1 shows an example in which the inflow temperature sensor 35a is provided upstream of the load-side heat exchanger 31 and the inflow temperature sensor 35a is provided downstream of the flow control valve 32.

During cooling operation, the heat-source-side controller 17 converts the suction pressure Ps measured by the suction pressure sensor 11a into a saturation temperature and thereby calculates an evaporating temperature that is the temperature of a saturated vapor at the suction pressure Ps. Further, the heat-source-side controller 17 calculates a degree of superheat of an evaporator outlet by subtracting the evaporating temperature from the first temperature measured by the first temperature sensor 21a. The term "degree of superheat of an evaporator outlet" refers to a degree of superheat of an outlet of the intermediate heat exchanger 21, which is used as an evaporator during cooling operation, and is hereinafter referred to as "degree of superheat". Moreover, the heat-source-side controller 17 controls the opening degree of the heat-source-side expansion device 14 on the basis of the degree of superheat. That is, when the degree of superheat becomes higher than a reference degree of superheat, the heat-source-side controller 17 controls the opening degree of the heat-source-side expansion device 14 so that the opening degree of the heat-source-side expansion device 14 increases, and when the degree of superheat becomes lower than the reference degree of superheat, the heat-source-side controller 17 controls the opening degree of the heat-source-side expansion device 14 so that the opening degree of the heat-source-side expansion device 14 decreases. The reference degree of superheat is set, for example, at 1 to 2 degrees Celsius, but can be changed as appropriate depending on the characteristics of the refrigerant circuit 40, the environment of installation of the air-conditioning system 100, or other conditions.

During heating operation, the relaying controller 24 converts the discharge pressure Pd measured by the discharge pressure sensor 11b into a saturation temperature and thereby calculates a condensing temperature that is the temperature of a saturated liquid at the discharge pressure Pd. Further, the relaying controller 24 calculates a degree of subcooling of a condenser outlet by subtracting the second temperature measured by the second temperature sensor 21b from the condensing temperature thus calculated. The term "degree of subcooling of a condenser outlet" refers to a degree of subcooling of the outlet of the intermediate heat exchanger 21, which is used as a condenser during heating operation, and is hereinafter referred to as "degree of subcooling". Moreover, the relaying controller 24 controls the opening degree of the relaying expansion device 22 on the basis of the degree of subcooling. That is, when the degree of subcooling becomes higher than a reference degree of subcooling, the relaying controller 24 controls the opening degree of the relaying expansion device 22 so that the opening degree of the relaying expansion device 22 increases, and when the degree of subcooling becomes lower than the reference degree of subcooling, the relaying controller 24 controls the opening degree of the relaying expansion device 22 so that the opening degree of the relaying expansion device 22 decreases. The reference degree of subcooling is set, for example, at 5 to 6 degrees Celsius, but can be changed as appropriate depending on the characteristics of the refrigerant circuit 40, the environment of installation of the air-conditioning system 100, or other conditions.

Figure 2:
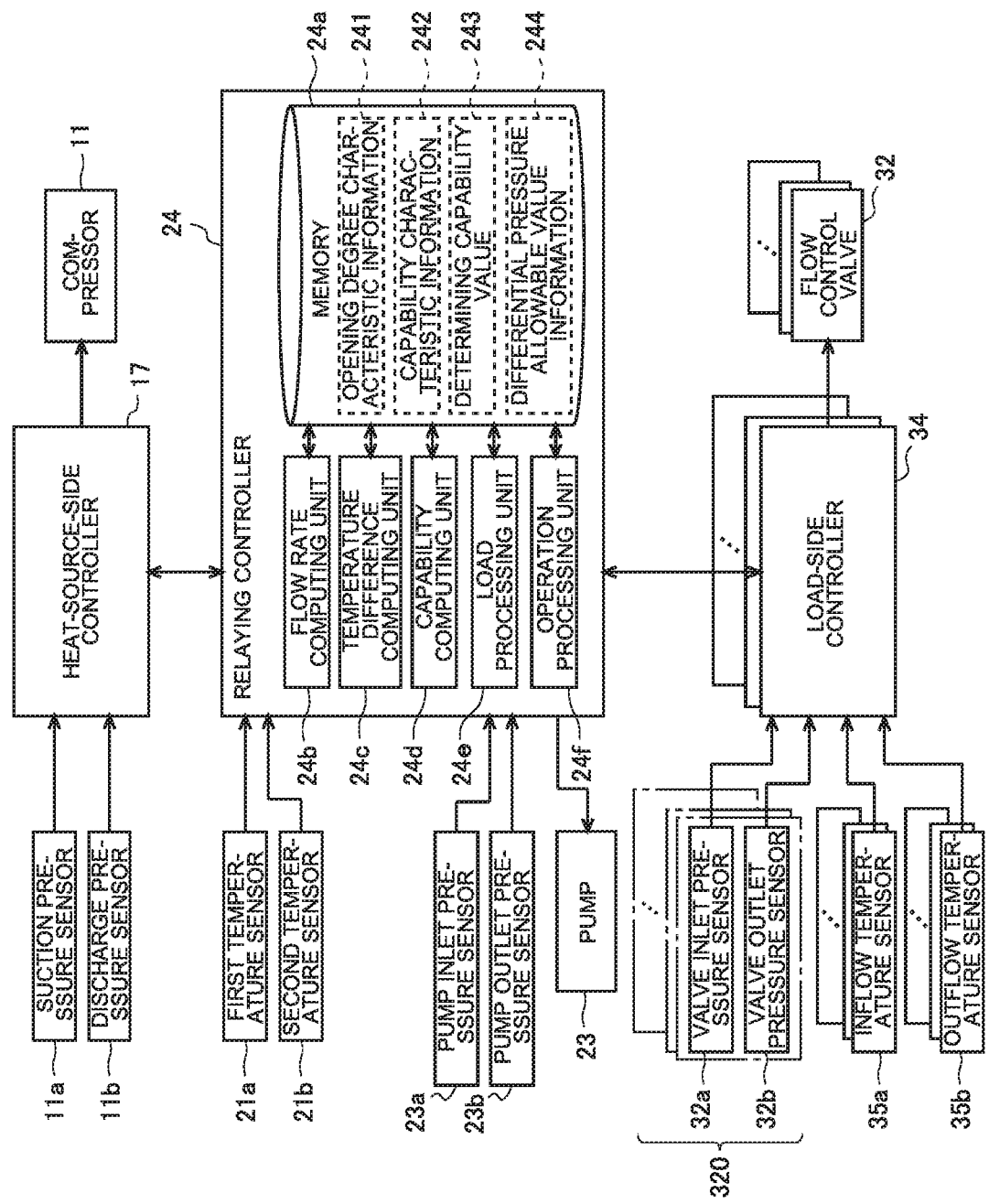
FIG. 2 is a block diagram showing a functional configuration of a relaying controller of FIG. 1.

FIG. 2 is a block diagram showing a functional configuration of the relaying controller of FIG. 1. FIG. 2 illustrates a functional configuration of constituent elements of the relaying controller 24 that is associated with energy-saving control. The relaying controller 24 controls the compressor 11 and the pump 23 in cooperation with the heat-source-side controller 17 and each load-side controller 34 on the basis of the flow rate of a heat medium that flows through each of the indoor units 30a to 30f. The relaying controller 24 includes the memory 24a, a flow rate computing unit 24b, a temperature difference computing unit 24c, a capability computing unit 24d, a load processing unit 24e, and an operation processing unit 24f.

The memory 24a stores opening degree characteristic information 241 that associates the opening degree of the flow control valve 32 with the Cv value of the flow control valve 32. The opening degree characteristic information 241 is provided in association with each of the indoor units 30a to 30f. Of course, indoor units of the same model or the same capacity may share one piece of opening degree characteristic information 241. The memory 24a stores capability characteristic information 242 that is information on the capability of each of the indoor units 30a to 30f. That is, the capability characteristic information 242 is information that indicates a heat exchange amount designed in advance for each of the indoor units 30a to 30f. The capability characteristic information 242 contains a maximum capability value that represents a maximum capability that each of the indoor units 30a to 30f is configured to exhibit.

The memory 24a stores a determining capability value 243 used as a criterion for determining whether to increase or decrease the rotation frequency of at least either the compressor 11 or the pump 23. That is, the determining capability value 243 is a value that is used as a criterion for determining the contents of control on the compressor 11 and the pump 23, and is set within a range of, for example, 90% to 100%. The memory 24a stores differential pressure allowable value information 244 that associates a total capability value that is the sum of capabilities exhibited by the indoor units 30a to 30f with a differential pressure allowable range set in association with an inlet-outlet differential pressure of the pump 23. The differential pressure allowable range is a range that allows the compressor 11 and the pump 23 to maintain their respective rotation frequencies.

The flow rate computing unit 24b calculates the flow rate of a heat medium of each of the indoor units 30a to 30f. The temperature difference computing unit 24c calculates an inlet-outlet temperature difference that is a temperature difference between the inflow temperature measured by the inflow temperature sensor 35a and the outflow temperature measured by the outflow temperature sensor 35b. The capability computing unit 24d calculates, using the flow rate calculated by the flow rate computing unit 24b and the inlet-outlet temperature difference calculated by the temperature difference computing unit 24c, an exhibited capability value that indicates a capability exhibited by each of the indoor units 30a to 30f.

The load processing unit 24e calculates a load of each of the indoor units 30a to 30f using the exhibited capability value calculated by the capability computing unit 24d. Note here that the load of each of the indoor units 30a to 30f increases as the proportion of the exhibited capability value to the maximum capability value increases. Further, the load processing unit 24e selects an indoor unit with the highest load of the indoor units 30a to 30f. The indoor unit with the highest load selected by the load processing unit 24e is hereinafter also referred to as "maximum load indoor unit". Moreover, the load processing unit 24e determines whether the exhibited capability value of the maximum load indoor unit is less than the determining capability value 243.

In a case where the load processing unit 24e has determined that the exhibited capability value is less than the determining capability value 243, the operation processing unit 24f exercises control to reduce the rotation frequency of at least either the compressor 11 or the pump 23. On the other hand, in a case where the load processing unit 24e has determined that the exhibited capability value is not less than the determining capability value 243, the operation processing unit 24f exercises control to increase the rotation frequency of at least either the compressor 11 or the pump 23. Note here that the rotation frequency of the compressor 11 corresponds to the operating frequency of the compressor motor. Further, the rotation frequency of the pump 23 corresponds to the rotational frequency of the motor of the pump 23.

In a case where the load processing unit 24e has determined that the exhibited capability value is less than the determining capability value 243, the operation processing unit 24f reduces the rotation frequency of the pump 23 by a preset pump decremental value when a pump differential pressure value is larger than an upper limit value of the differential pressure allowable range. The operation processing unit 24f reduces the rotation frequency of the pump 23 by the pump decremental value every time the conditions that the exhibited capability value is less than the determining capability value 243 and the pump differential pressure value is larger than the upper limit value of the differential pressure allowable range are met in a process of chronologically comparing the pump differential pressure value with the differential pressure allowable range.

In a case where the load processing unit 24e has determined that the exhibited capability value is less than the determining capability value 243, the operation processing unit 24f reduces the rotation frequency of the compressor 11 by a preset compressor decremental value when the pump differential pressure value is smaller than a lower limit value of the differential pressure allowable range. The operation processing unit 24f reduces the rotation frequency of the compressor 11 by the compressor decremental value every time the conditions that the exhibited capability value is less than the determining capability value 243 and the pump differential pressure value is smaller than the lower limit value of the differential pressure allowable range are met in the aforementioned chronologically comparing process.

In a case where the load processing unit 24e has determined that the exhibited capability value is not less than the determining capability value 243, the operation processing unit 24f increases the rotation frequency of the compressor 11 by a preset compressor incremental value when the pump differential pressure value is larger than the upper limit value of the differential pressure allowable range. The operation processing unit 24f increases the rotation frequency of the compressor 11 by the compressor incremental value every time the conditions that the exhibited capability value is not less than the determining capability value 243 and the pump differential pressure value is larger than the upper limit value of the differential pressure allowable range are met in the aforementioned chronologically comparing process.

In a case where the load processing unit 24e has determined that the exhibited capability value is not less than the determining capability value 243, the operation processing unit 24f increases the rotation frequency of the pump 23 by a preset pump incremental value when the pump differential pressure value is smaller than the lower limit value of the differential pressure allowable range. The operation processing unit 24f increases the rotation frequency of the pump 23 by the pump incremental value every time the conditions that the exhibited capability value is not less than the determining capability value 243 and the pump differential pressure value is smaller than the lower limit value of the differential pressure allowable range are met in the aforementioned chronologically comparing process.

That is, in a case where identical conditions are continuously met in the aforementioned chronologically comparing process, the operation processing unit 24f changes the rotation frequency of the compressor 11 or the pump 23 stepwise. The pump decremental value, the pump incremental value, the compressor decremental value, and the compressor incremental value are set depending on the configuration of the air-conditioning system 100 and the environment of installation of the air-conditioning system 100, and can be changed as appropriate. The pump decremental value and the pump incremental value may be identical values or may be different values. Similarly, the compressor decremental value and the compressor incremental value may be identical values or may be different values.

Further, the pump decremental value, the pump incremental value, the compressor decremental value, and the compressor incremental value may be set to a plurality of different values. Moreover, in a case where identical conditions are continuously met an increased number of times in the aforementioned chronologically comparing process, the operation processing unit 24f preferably decreases the pump decremental value, the pump incremental value, the compressor decremental value, and the compressor incremental value. In this case, the memory 24a preferably stores in advance number-of-times correspondence information that associates the number of times identical conditions are continuously met with each of the pump decremental value, the pump incremental value, the compressor decremental value, and the compressor incremental value, and the operation processing unit 24f preferably finds each value with reference to the number-of-times correspondence information.

Figure 3:
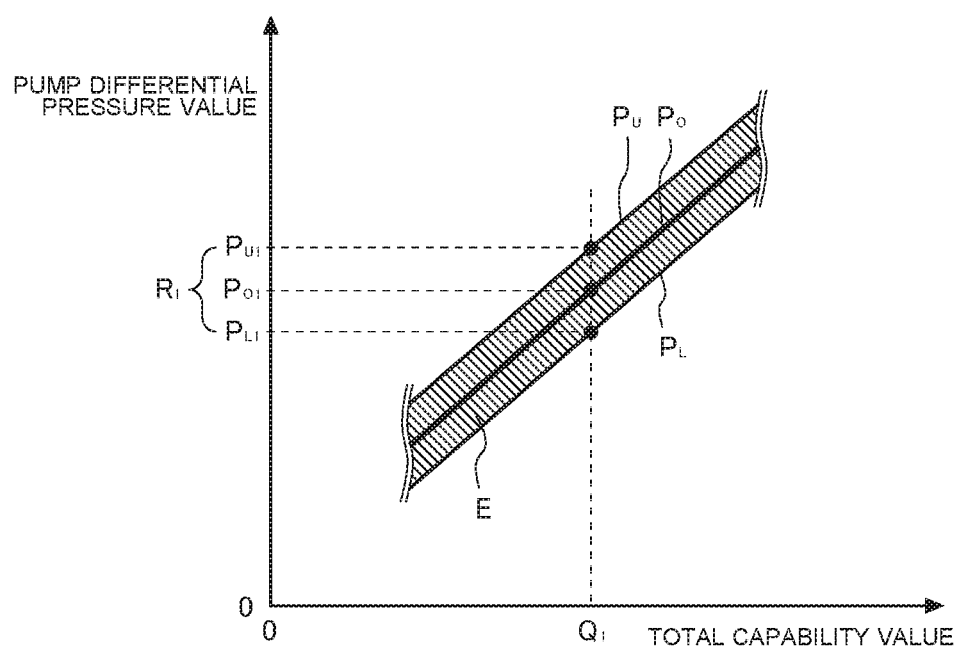
FIG. 3 is a conceptual diagram for explaining differential pressure allowable value information stored in a memory of FIG. 1.

FIG. 3 is a conceptual diagram for explaining the differential pressure allowable value information stored in the memory of FIG. 1. In FIG. 3, the horizontal axis represents the total capability value, and the vertical axis represents the pump differential pressure value. The differential pressure ideal line $P_O$ indicates an ideal pump differential pressure value that corresponds to the total capability value, That is, the differential pressure ideal line $P_O$ is a line that connects ideal pump differential pressure values that are determined depending on variations in the total capability value. The differential pressure upper limit line $P_U$ is a line derived by adding a coefficient of addition to the differential pressure ideal line $P_O$. The differential pressure lower limit line $P_L$ is a line derived by subtracting a coefficient of subtraction from the differential pressure ideal line $P_O$. Moreover, a range in which an allowable region E between the differential pressure lower limit line $P_L$ and the differential pressure upper limit line $P_U$ intersects any of separate total capability values is a differential pressure allowable range that corresponds to the total capability value. That is, the differential pressure upper limit line $P_U$ corresponds to upper limits of differential pressure allowable ranges for each separate total capability value, and the differential pressure lower limit line $P_L$ corresponds to lower limits of differential pressure allowable ranges for each separate total capability value.

As shown in FIG. 3, in a case where the total capability value is "$Q_1$", the upper limit value of the differential pressure allowable range is "$P_{U1}$", and the lower limit value of the differential pressure allowable range is "$P_{L1}$". Moreover, the differential pressure allowable range in which the total capability value corresponds to $Q_1$ is "$R_1$".

Although FIG. 3 illustrates a case where the differential pressure ideal line $P_O$, the differential pressure upper limit line $P_U$, and the differential pressure lower limit line $P_L$ are straight lines, this is not intended to impose any limitation, and the differential pressure ideal line $P_O$, the differential pressure upper limit line $P_U$, and the differential pressure lower limit line $P_L$ may be curved lines. Further, although FIG. 3 illustrates a case where the differential pressure upper limit line $P_U$ and the differential pressure lower limit line $P_L$ are parallel to the differential pressure ideal line $P_O$, this is not intended to impose any limitation, and the differential pressure upper limit line $P_U$ and the differential pressure lower limit line $P_L$ do not need to be parallel to the differential pressure ideal line $P_O$. For example, the differential pressure upper limit line $P_U$ and the differential pressure lower limit line $P_L$ may have certain tilts to the differential pressure ideal line $P_O$. That is, the coefficient of addition and the coefficient of subtraction may vary from one total capability value to another. In addition, although FIG. 3 illustrates the differential pressure allowable value information 244 as defined on a graph, this is not intended to impose any limitation, and the differential pressure allowable value information 244 may be table information that associates the total capability value with the differential pressure allowable range.

The heat-source-side controller 17, the relaying controller 24, the load-side controller 34 of each of the indoor units 30a to 30f can each be formed by an arithmetic unit such as a microcomputer and software that is configured to perform each of the aforementioned functions in cooperation with such an arithmetic unit. The heat-source-side controller 17, the relaying controller 24, the load-side controller 34 of each of the indoor units 30a to 30f may each include hardware such as a circuit device that is configured to perform some or all of the aforementioned functions. The memory 17a and the memory 24a can each be, for example, a random-access memory (RAM), a read-only memory (ROM), a programmable ROM (PROM) such as a flash memory, or a hard disk drive (HDD).

Figure 4:
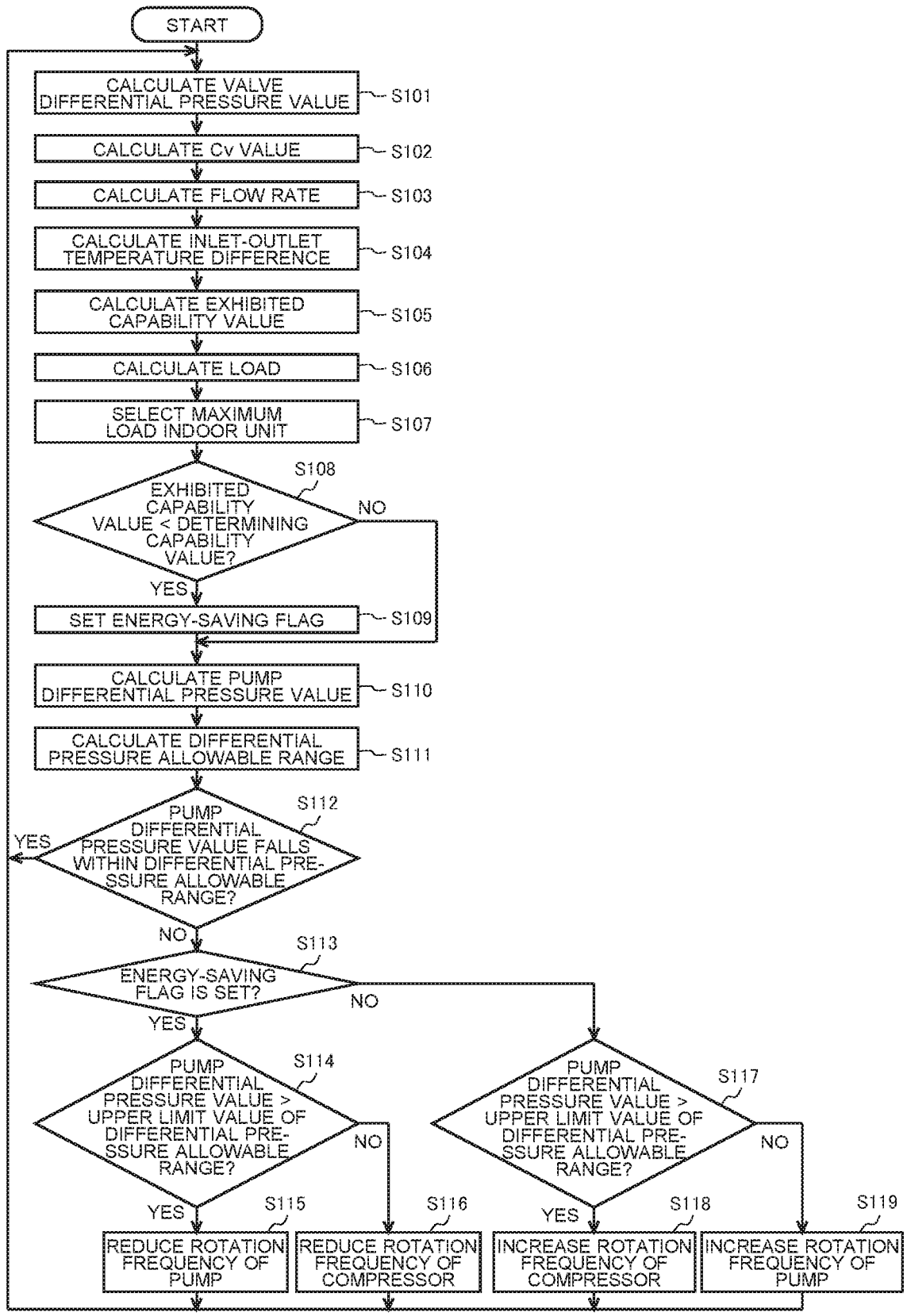
FIG. 4 is a flow chart showing an operation of the air-conditioning system of FIG. 1.

FIG. 4 is a flow chart showing an operation of the air-conditioning system of FIG. 1. The flow of an operation of energy-saving control, included in an air-conditioning control method executed by the air-conditioning system 100, that the relaying controller 24 exercises through the use of the flow rate information is described with reference to FIG. 4.

First, the flow rate computing unit 24b acquires a valve inlet pressure from the valve inlet pressure sensor 32a and acquires a valve outlet pressure from the valve outlet pressure sensor 32b. Then, the flow rate computing unit 24b calculates, for each of the indoor units 30a to 30f, a valve differential pressure value that represents a differential pressure between the valve inlet pressure and the valve outlet pressure (step S101). Further, the flow rate computing unit 24b acquires the opening degree of the flow control valve 32 of each of the indoor units 30a to 30f from the corresponding load-side controller 34. Then, the flow rate computing unit 24b calculates the Cv value of each of the indoor units 30a to 30f by comparing the opening degree of the flow control valve 32 of the indoor unit with the opening degree characteristic information 241 (step S102).

Next, the flow rate computing unit 24b calculates the flow rate of a heat medium of each of the indoor units 30a to 30f using the valve differential pressure value and the Cv value. Specifically, for example, a flow rate derivation function whose variables are the valve differential pressure value and the Cv value is stored in advance in the memory 24a. In this case, the flow rate computing unit 24b is configured to calculate the flow rate of a heat medium of each of the indoor units 30a to 30f by substituting the valve differential pressure value and the Cv value in the flow rate derivation function (step S103).

Next, the temperature difference computing unit 24c acquires an inflow temperature from the inflow temperature sensor 35a and acquires an outflow temperature from the outflow temperature sensor 35b. Then, the temperature difference computing unit 24c calculates an inlet-outlet temperature difference that is a temperature difference between the inflow temperature and the outflow temperature (step S104).

Next, the capability computing unit 24d calculates the exhibited capability value of each of the indoor units 30a to 30f using the flow rate calculated by the flow rate computing unit 24b and the inlet-outlet temperature difference calculated by the temperature difference computing unit 24c. At this time, the capability computing unit 24d calculates a total capability value that is the sum of the respective exhibited capability values of the indoor units 30a to 30f and temporarily stores the total capability value in the memory 24a (step S105).

Next, the load processing unit 24e calculates the load of each of the indoor units 30a to 30f using the exhibited capability value calculated by the capability computing unit 24d. That is, the load processing unit 24e calculates the load of each of the indoor units 30a to 30f from the proportion of the exhibited capability value to the maximum capability value contained in the capability characteristic information 242 (step S106). Then, the load processing unit 24e compares the respective loads of the indoor units 30a to 30f with one another and selects an indoor unit with the highest load as a maximum load indoor unit from among the indoor units 30a to 30f (step S107).

Next, the load processing unit 24e determines whether the exhibited capability value of the maximum load indoor unit is less than the determining capability value 243 (step S108). When the exhibited capability value of the maximum load indoor unit is less than the determining capability value 243 (YES in step S108), the load processing unit 24e sets an energy-saving flag. The term "energy-saving flag" here refers to a flag that indicates the feasibility of energy-saving control that reduces the rotation frequency of at least either the compressor 11 or the pump 23. For example, "1" represents a state in which the energy-saving flag is set and "0" represents a state where the energy-saving flag is not set, that is, a state in which the energy-saving flag has been reset (step S109). On the other hand, when the exhibited capability value of the maximum load indoor unit is not less than the determining capability value 243, the load processing unit 24e does not set the energy-saving flag (NO in step S108).

The operation processing unit 24f acquires a pump inlet pressure from the pump inlet pressure sensor 23a and acquires a pump outlet pressure from the pump outlet pressure sensor 23b. Then, the operation processing unit 24f calculates a pump differential pressure value that represents a differential pressure between the pump inlet pressure and the pump outlet pressure (step S110). Next, the operation processing unit 24f reads out, from the memory 24a, the total capability value calculated by the capability computing unit 24d and calculates, by comparing the total capability value with the differential pressure allowable value information 244, a differential pressure allowable range that corresponds to the total capability value (step S111).

Then, the operation processing unit 24f determines whether the pump differential pressure value falls within the differential pressure allowable range (step S112). When the pump differential pressure value falls within the differential pressure allowable range (YES in step S112), the operation processing unit 24f returns the process to step S101 while the current operating statuses of the compressor 11 and the pump 23 are maintained, regardless of a determination result yielded by the load processing unit 24e.

On the other hand, when the pump differential pressure value is out of the differential pressure allowable range (NO in step S112), the operation processing unit 24f checks whether the energy-saving fag is set (step S113). When the energy-saving flag is set (YES in step S113) and when the pump differential pressure value is larger than the upper limit value of the differential pressure allowable range (YES in step S114), the operation processing unit 24f reduces the rotation frequency of the pump 23 (step S115) and returns the process to step S101. When the energy-saving flag is set (YES in step S113) and when the pump differential pressure value is smaller than the lower limit value of the differential pressure allowable range (NO in step S114), the operation processing unit 24f reduces the rotation frequency of the compressor 11 (step S116) and returns the process to step S101. More specifically, in step S116, the operation processing unit 24f outputs, to the heat-source-side controller 17, a reduction command signal that instructs the heat-source-side controller 17 to reduce the rotation frequency of the compressor 11. Then, the heat-source-side controller 17 reduces the rotation frequency of the compressor 11 by the compressor decremental value in accordance with the reduction command signal from the operation processing unit 24f.

When the energy-saving flag is not set (NO in step S113) and when the pump differential pressure value is larger than the upper limit value of the differential pressure allowable range (YES in step S117), the operation processing unit 24f increases the rotation frequency of the compressor 11 (step S118) and returns the process to step S101. More specifically, in step S118, the operation processing unit 24f outputs, to the heat-source-side controller 17, an increase command signal that instructs the heat-source-side controller 17 to increase the rotation frequency of the compressor 11. Then, the heat-source-side controller 17 increases the rotation frequency of the compressor 11 by the compressor incremental value in accordance with the increase command signal from the operation processing unit 24f.

When the energy-saving flag is not set (NO in step S113) and when the pump differential pressure value is smaller than the lower limit value of the differential pressure allowable range (NO in step S117), the operation processing unit 24f increases the rotation frequency of the pump 23 (step S119) and returns the process to step S101.

Note here that in the air-conditioning system 100, the span of control of the heat-source device 10 and the relay device 20 is longer than the span of control of each of the indoor units 30a to 30f. That is, the relaying controller 24 is configured to return the process to step S101 after a predetermined waiting time has elapsed since steps YES in S112, S115, S116, S118, or S119 was executed. The waiting time is set depending on the span of control of each of the indoor units 30a to 30f.

Although the foregoing has described the operation in the order of the reference signs assigned to FIG. 4, some of the steps may be executed in parallel or the order of the steps may be partially changed. For example, step S101 and step S102 may be executed in parallel or may exchange their places with each other. Further, step S110 and step S111 may be executed in parallel or may exchange their places with each other.

As noted above, the air-conditioning system 100 of Embodiment 1 controls the operation of at least either the compressor 11 or the pump 23 on the basis of the flow rate information, which is varied by the system configuration. Consequently, it is possible to enhance the accuracy of control in the whole system, and it is thus possible to achieve energy saving. The air-conditioning system of Patent Literature 1 cannot enhance the accuracy of pump control above a certain level, as the opening degree of a flow control valve is not necessarily varied by a system environment that changes depending on the environment of installation of an indoor unit on the spot or other conditions. On the other hand, the compressor 11 and the pump 23 are efficiently controlled, as the valve inlet pressure and the valve outlet pressure, which are used as the flow rate information of Embodiment 1, are varied by the system configuration.

Further, the air-conditioning system of Patent Literature 1 is used only to control the pump in the heat medium circuit and cannot be used to control an actuator in the refrigerant circuit. This configuration may break down the balance in control between the circuits and reduce the accuracy of control in the whole system. In this regard, the air-conditioning system 100 is configured to control the compressor 11 in the refrigerant circuit 40 and the pump 23 in the heat medium circuit 60 on the basis of the flow rate information, and it is thus possible to bring about improvement in accuracy of control in the whole system.

Furthermore, in a case where the exhibited capability value of the maximum load indoor unit is less than the determining capability value, the relaying controller 24 reduces the rotation frequency of at least either the compressor 11 or the pump 23. That is, the relaying controller 24 reduces the rotation frequency of at least either the compressor 11 or the pump 23 so that the exhibited capability value of the maximum load indoor unit approximates to the determining capability value. Consequently, it is possible to reduce power consumption and achieve energy saving.

Note here that, for example, indoor units of different capacities are disposed in separate rooms of a hotel depending on the sizes of the rooms or other conditions. That is, an air-conditioning system is likely to include a mixture of indoor units of different capacities. Moreover, in an air-conditioning system that includes a mixture of indoor units of different capacities, using only a change in the opening degree of the flow control valve of each indoor unit makes it impossible to control each actuator in adaptation to the capacity of the indoor unit, the environment of installation on the spot, or other conditions. In this regard, in the air-conditioning system 100, the flow rate information that the relaying controller 24 uses to control the compressor 11 and the pump 23 is varied by the capacities of the indoor units, the environments of installation of the indoor units on the spots, or other conditions. That is, the valve differential pressure value, which represents the differential pressure between the valve inlet pressure and the valve outlet pressure, and the flow rate of a heat medium calculated from the valve differential pressure value are varied by the system configuration. Consequently, it is possible to enhance the accuracy of control in the whole system.

Further, the relaying controller 24 is configured to calculate the exhibited capacity value of each of the indoor units 30a to 30f with a high degree of accuracy using the flow rate of a heat medium and the inlet-outlet temperature difference, which represents the temperature difference between the inflow temperature and the outflow temperature. In addition, as the flow control valve 32 of each of the indoor units 30a to 30f is provided downstream of the load-side heat exchanger 31, a heat medium can be prevented, for example, from rejecting heat at the flow control valve 32 before the heat medium flows into the load-side heat exchanger 31. Consequently, it is possible to prevent a decrease in heat exchange efficiency. Furthermore, the relaying controller 24 calculates the load of each of the indoor units 30a to 30f from the proportion of the exhibited capability value to the maximum capability value. Consequently, it is possible to make a load comparison with a high degree of accuracy.

Incidentally, although the foregoing description has illustrated a case where the operation processing unit 24f determines the contents of control of the compressor 11 and the pump 23 by comparing the pump differential pressure value with the differential pressure allowable range, this is not intended to impose any limitation. The operation processing unit 24f may determine the contents of control of the compressor 11 and the pump 23 by comparing the pump differential pressure value with a differential pressure ideal value. That is, the differential pressure allowable value information 244 may be information that associates the total capability value of the indoor units 30a to 30f with a differential pressure ideal value set in association with an inlet-outlet differential pressure of the pump 23. With reference to FIG. 3, a differential pressure ideal value that corresponds to the total capability value $Q_1$ is the pump differential pressure value $P_{O1}$ on the differential pressure ideal line $P_O$ at the total capability value $Q_1$.

In this case, the operation processing unit 24f reduces the rotation frequency of the pump 23 by the pump decremental value when the conditions that the exhibited capability value is less than the determining capability value 243 and the pump differential pressure value is larger than the differential pressure ideal value are met. The operation processing unit 24f reduces the rotation frequency of the compressor 11 by the compressor decremental value every time the conditions that the exhibited capability value is less than the determining capability value 243 and the pump differential pressure value is smaller than the differential pressure ideal value are met. The operation processing unit 24f increases the rotation frequency of the compressor 11 by the compressor incremental value every time the conditions that the exhibited capability value is not less than the determining capability value 243 and the pump differential pressure value is larger than the differential pressure ideal value are met. The operation processing unit 24f increases the rotation frequency of the pump 23 by the pump incremental value every time the conditions that the exhibited capability value is not less than the determining capability value 243 and the pump differential pressure value is smaller than the differential pressure ideal value are met.

Note, however, that determining the contents of control of the compressor 11 and the pump 23 by comparing the pump differential pressure value with the differential pressure allowable range makes it possible to achieve stability of control, as it is thus possible to avoid a situation that effects excessive changes in the rotation frequencies of the compressor 11 and the pump 23.

<Modification 1-1>

Figure 5:
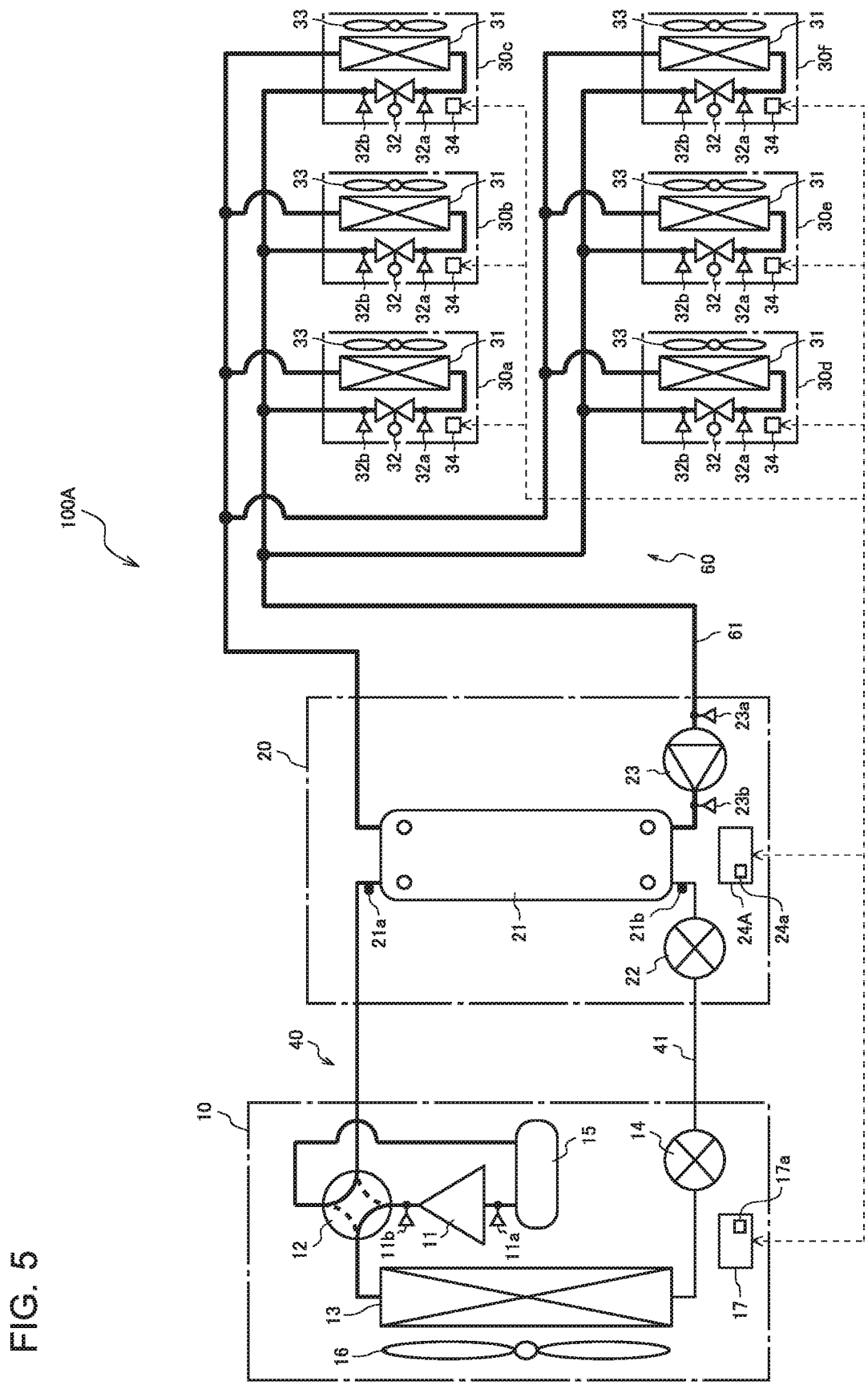
FIG. 5 is a circuit diagram illustrating a configuration of an air-conditioning system according to Modification 1-1 of Embodiment 1 of the present disclosure.
Figure 6:
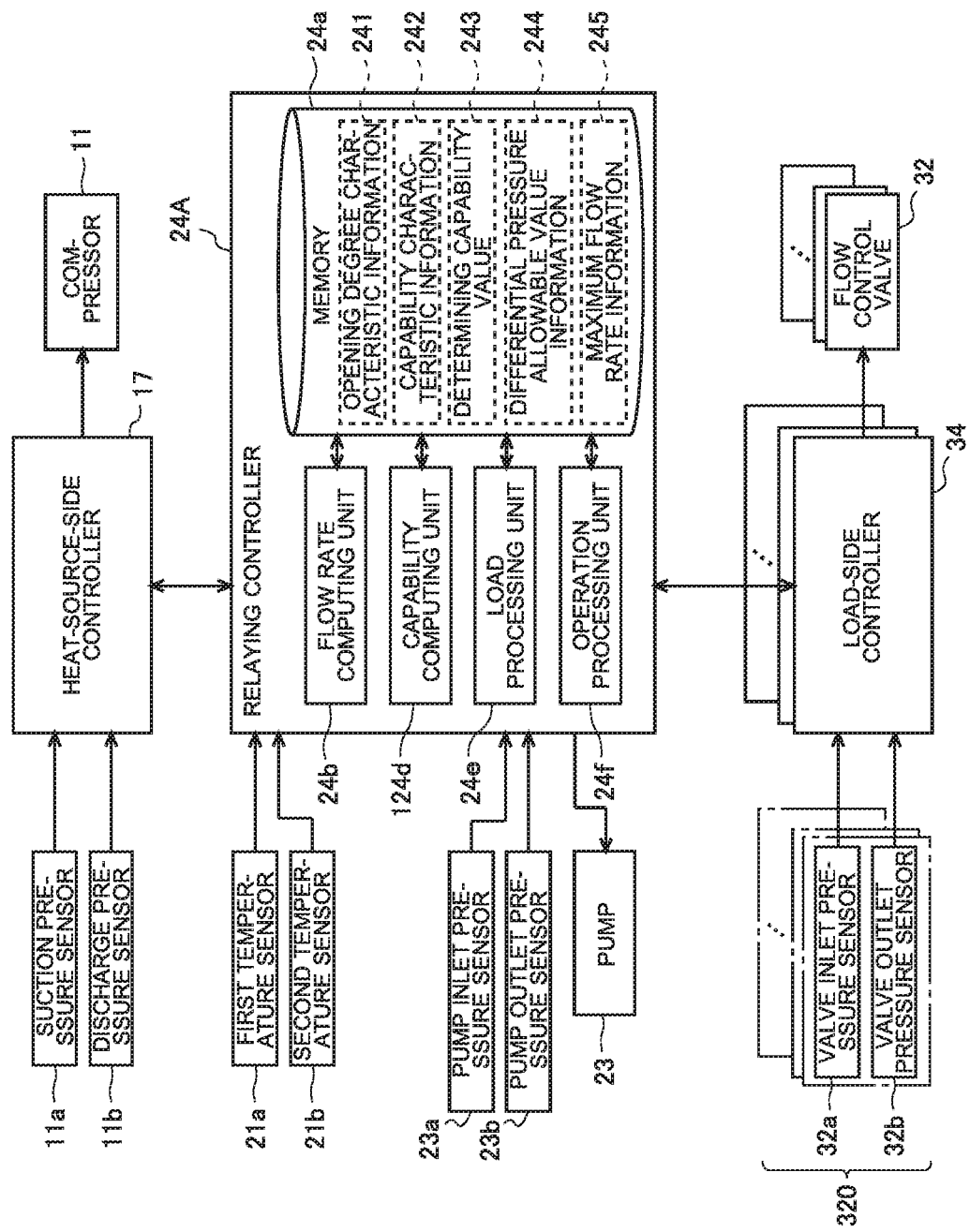
FIG. 6 is a block diagram showing a functional configuration of a relaying controller of FIG. 5.

FIG. 5 is a circuit diagram illustrating a configuration of an air-conditioning system according to Modification 1-1 of Embodiment 1 of the present disclosure. FIG. 6 is a block diagram showing a functional configuration of a relaying controller of FIG. 5. Components that are equivalent to the components shown in FIGS. 1 and 2 are given the same reference signs, and a description of such components is omitted.

As shown in FIGS. 5 and 6, an air-conditioning system 100A of Modification 1-1 differs from the air-conditioning system 100 in that the air-conditioning system 100A does not include the inflow temperature sensor 35a, the outflow temperature sensor 35b, and the temperature difference computing unit 24c. Moreover, the memory 24a stores maximum flow rate information 245 that indicates the maximum flow rate of a heat medium that flows through each of the indoor units 30a to 30f.

A capability computing unit 124d of a relaying controller 24A reads out the maximum flow rate of each of the indoor units 30a to 30f from the maximum flow rate information 245. Moreover, the capability computing unit 124d calculates, as an exhibited capability value for each of the indoor units 30a to 30f, the proportion of the flow rate calculated by the flow rate computing unit 24b to the maximum flow rate. In other respects, the configuration of the capability computing unit 124d is the same as the configuration of the aforementioned capability computing unit 24d.

The flow of an operation of energy-saving control that is exercised by the relaying controller 24A is the same as the flow of the operation described with reference to FIG. 4. Specifically, after execution of step S103, the relaying controller 24A proceeds to step S105 without executing step S104. Then, as mentioned above, the relaying controller 24A calculates an exhibited capability value using the maximum flow rate information 245.

As noted above, the air-conditioning system 100A of Modification 1-1 calculates the proportion of a flow rate to the maximum flow rate as an exhibited capability value. Consequently, it is possible to exercise energy-saving control without using the inflow temperature sensor 35a and the outflow temperature sensor 35b, and it is thus possible to reduce costs.

<Modification 1-2>

Figure 7:
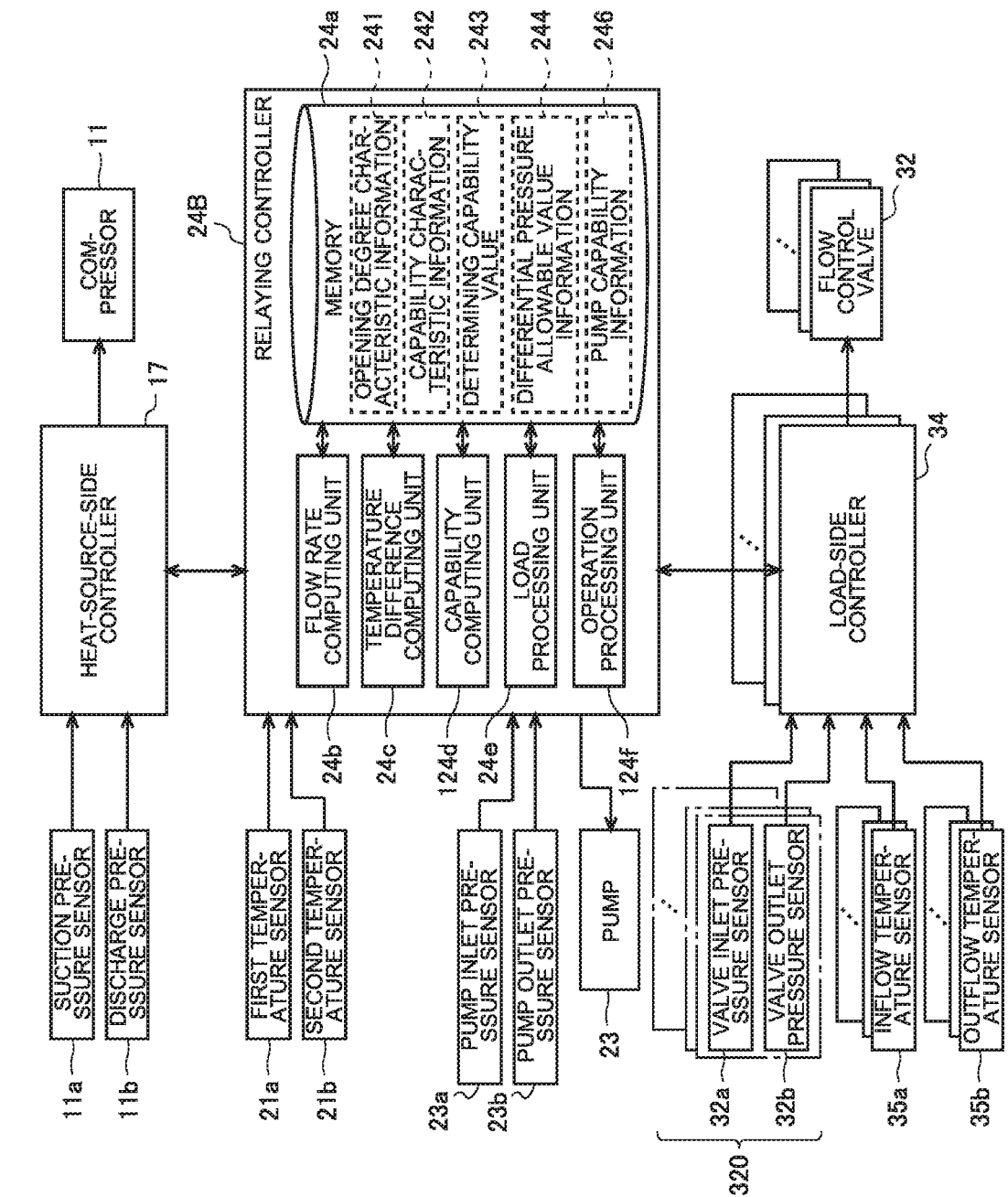
FIG. 7 is a block diagram showing a functional configuration of a relaying controller of an air-conditioning system according to Modification 1-2 of Embodiment 1 of the present disclosure.

FIG. 7 is a block diagram showing a functional configuration of a relaying controller of an air-conditioning system according to Modification 1-2 of Embodiment 1 of the present disclosure. Components that are equivalent to the components shown in FIGS. 1 and 2 are given the same reference signs, and a description of such components is omitted.

As shown in FIG. 7, a relaying controller 24B of the air-conditioning system 100 of Modification 1-2 includes the memory 24a, the flow rate computing unit 24b, the temperature difference computing unit 24c, a capability computing unit 124d, the load processing unit 24e, and an operation processing unit 124f. The memory 24a stores pump capability information 246 that associates the pump differential pressure value with a pump capability value that indicates the capability of the pump 23. Note here that the capability of the pump 23 corresponds to the flow rate of a heat medium that the pump 23 discharges per unit time. The pump capability information 246 may be a graph that associates the pump differential pressure value with the pump capability value or may be table information that associates the pump differential pressure value with the pump capability value.

Note here that a heat medium in the heat medium circuit 60, that is, a heat medium that passes through all of the plurality of indoor units 30a to 30f, flows into the pump 23. That is, the pump capability value is a value that corresponds to the aforementioned total capability value. That is, in Modification 1-2, the differential pressure allowable value information 244 is information that associates the pump capability value with the differential pressure allowable range.

As is the case with the aforementioned capability computing unit 24d, the capability computing unit 124d calculates the exhibited capability value of each of the indoor units 30a to 30f using the flow rate calculated by the flow rate computing unit 24b and the inlet-outlet temperature difference calculated by the temperature difference computing unit 24c. Meanwhile, unlike the aforementioned capability computing unit 24d, the capability computing unit 124d is not configured to calculate the total capability value.

The operation processing unit 124f calculates a pump differential pressure value that represents a differential pressure between the pump inlet pressure and the pump outlet pressure. Further, the operation processing unit 124f calculates the pump capability value by comparing the pump differential pressure value with the pump capability information 246. Moreover, the operation processing unit 124f calculates the differential pressure allowable range by comparing the pump capability value with the differential pressure allowable value information 244. In other respects, the configuration of the operation processing unit 124f is the same as the configuration of the aforementioned operation processing unit 24f.

The flow of an operation of energy-saving control that is exercised by the relaying controller 24B is the same as the flow of the operation described with reference to FIG. 4. More specifically, in step S111, as mentioned above, the relaying controller 24B calculates the pump capability value from the pump differential pressure value and the pump capability information 246 and calculates the differential pressure allowable range from the pump capability value and the differential pressure allowable value information 244.

As noted above, in Modification 1-2, the use of the pump capability value as the total capability value makes it possible to compare the pump differential pressure value with the differential pressure allowable range without being influenced by the operating status of each of the indoor units 30a to 30f, and it is thus possible to bring about improvement in determination accuracy. Further, in each process of FIG. 4, the processing of step S111 does not depend on the processing of step S105. Therefore, for example, the process from step S101 to step S108 may be performed at the timing of step S113. As is the case with the aforementioned air-conditioning system 100A of Modification 1-1, the air-conditioning system 100 of Modification 1-2 may calculate the exhibited capability value of each of the indoor units 30a to 30f without using the inlet-outlet temperature difference.

<Modification 1-3>

Figure 8:
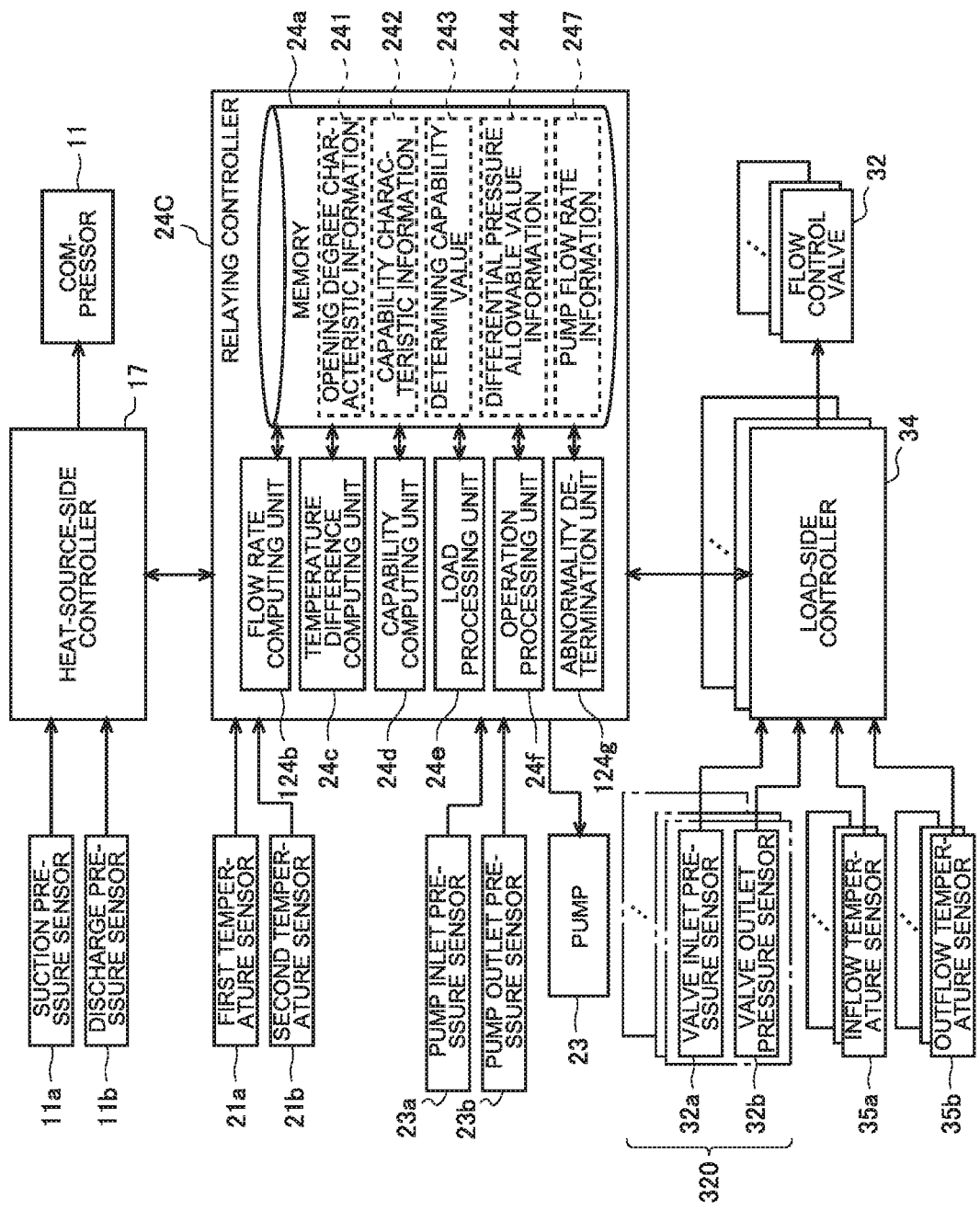
FIG. 8 is a block diagram showing a functional configuration of a relaying controller of an air-conditioning system according to Modification 1-3 of Embodiment 1 of the present disclosure.

FIG. 8 is a block diagram showing a functional configuration of a relaying controller of an air-conditioning system according to Modification 1-3 of Embodiment 1 of the present disclosure. Components that are equivalent to the components shown in FIGS. 1 and 2 are given the same reference signs, and a description of such components is omitted.

As shown in FIG. 8, the relaying controller 24C of the air-conditioning system 100 of Modification 1-3 includes the memory 24a, a flow rate computing unit 124b, the temperature difference computing unit 24c, the capability computing unit 24d, the load processing unit 24e, the operation processing unit 24f, and an abnormality determination unit 124g. The memory 24a stores pump flow rate information 247 that associates the pump differential pressure value with a pump discharge flow rate value that indicates the flow rate of a heat medium that the pump 23 discharges. The pump flow rate information 247 may be a graph that associates the pump differential pressure value with the pump discharge flow rate value or may be table information that associates the pump differential pressure value with the pump discharge flow rate value.

As is the case with the aforementioned flow rate computing unit 24b, the flow rate computing unit 124b calculates the flow rate of a heat medium of each of the indoor units 30a to 30f. Furthermore, the flow rate computing unit 124b calculates a total flow rate value that is the total of the flow rates of heat media of the indoor units 30a to 30f and temporarily stores the total flow rate value in the memory 24a.

The abnormality determination unit 124g calculates the pump discharge flow rate value by comparing the pump differential pressure value calculated by the operation processing unit 24f with the pump flow rate information 247. Further, the abnormality determination unit 124g reads out, from the memory 24a, the total flow rate value that the flow rate computing unit 124b has stored in the memory 24a. Moreover, the abnormality determination unit 124g determines, on the basis of the proportion of the total flow rate value to the pump discharge flow rate value, whether an abnormality has occurred in at least one of the valve inlet pressure sensor 32a, the valve outlet pressure sensor 32b, the pump inlet pressure sensor 23a, and the pump outlet pressure sensor 23b.

More specifically, the abnormality determination unit 124g calculates a flow rate proportion ((Total flow rate value/Pump discharge flow rate value)×100[%]) that is the proportion of the total flow rate value to the pump discharge flow rate value. Moreover, by determining whether the flow rate proportion falls within a normal range, the abnormality determination unit 124g determines whether an abnormality has occurred in at least one pressure sensor. Note here that the normal range is a range from a lower limit proportion to an upper limit proportion.

That is, by determining whether a mathematical formula (1) is satisfied as shown below, the abnormality determination unit 124g determines whether an abnormality has occurred in at least one pressure sensor. The lower limit proportion is set, for example, at 90[%], and the upper limit proportion is set, for example, at 110[%]. Of course, the lower limit proportion and the upper limit proportion can be changed as appropriate.

[Math. 1]

$$\text{Lower limit proportion} \leq (\text{Total flow rate value}/\text{Pump discharge flow rate value}) \times 100 \leq \text{Upper limit proportion} \quad (1)$$

In a case where the flow rate proportion is out of the normal range, the abnormality determination unit 124g transmits an abnormality occurrence signal that indicates the occurrence of an abnormality, for example, to at least one of the indoor units 30a to 30f. In this case, when each of the indoor units 30a to 30f includes a display unit that is, for example, a liquid crystal display and the load-side controller 34 receives an abnormality occurrence signal from the abnormality determination unit 124g, the load-side controller 34 causes the display unit to display information that indicates the occurrence of an abnormality. Similarly, in a case where each of the indoor units 30a to 30f is linked with a remote controller provided with a display unit, when the load-side controller 34 receives an abnormality occurrence signal from the abnormality determination unit 124g, the load-side controller 34 causes the display unit to display information that indicates the occurrence of an abnormality. Further, when each of the indoor units 30a to 30f includes a notification unit that outputs a sound or a voice and the load-side controller 34 receives an abnormality occurrence signal from the abnormality determination unit 124g, the load-side controller 34 causes the notification unit to output a sound or voice that indicates the occurrence of an abnormality. Similarly, in a case where each of the indoor units 30a to 30f is linked with a remote controller provided with a notification unit, when the load-side controller 34 receives an abnormality occurrence signal from the abnormality determination unit 124g, the load-side controller 34 causes the notification unit to output a sound or voice that indicates the occurrence of an abnormality.

As noted above, by making a comparison between the pump discharge flow rate value and the total flow rate value, which are supposed to be substantially equal values because of the configuration of the heat medium circuit 60, the air-conditioning system 100 of Modification 1-3 is configured to determine whether an abnormality has occurred in at least one. Moreover, when the flow rate proportion is out of the normal range, the load-side controller 34 for example causes the display unit to display information that indicates the occurrence of an abnormality, so that a user or other person is prompted to handle the abnormality. Consequently, it is possible to prevent, for example, malfunction of a constituent element, and it is thus possible to enhance the reliability of the system.

Incidentally, although Modification 1-3 has illustrated a case where whether an abnormality has occurred in at least one pressure sensor is determined on the basis of the proportion of the total flow rate value to the pump discharge flow rate value, this is not intended to impose any limitation. For example, the configuration of a part of Modification 1-2 may be added to the configuration of Modification 1-3 so that whether an abnormality has occurred in at least one pressure sensor is determined on the basis of the proportion of the total capability value to the pump capability value. Of course, as is the case with the aforementioned air-conditioning system 100A of Modification 1-1, the air-conditioning system 100 of Modification 1-3 may calculate the exhibited capability value of each of the indoor units 30a to 30f without using the inlet-outlet temperature difference.

Embodiment 2

Figure 9:
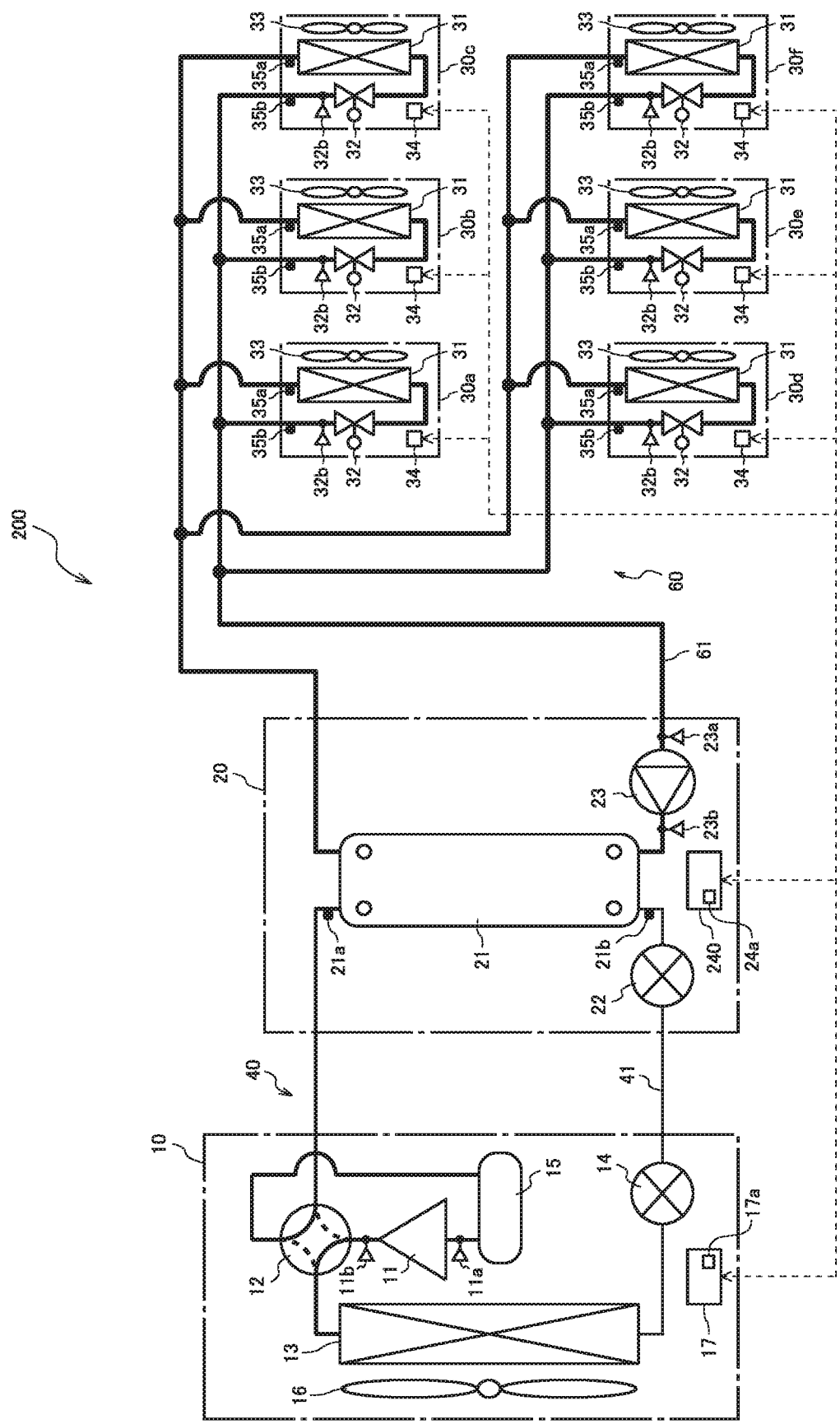
FIG. 9 is a circuit diagram illustrating a configuration of an air-conditioning system according to Embodiment 2 of the present disclosure.
Figure 10:
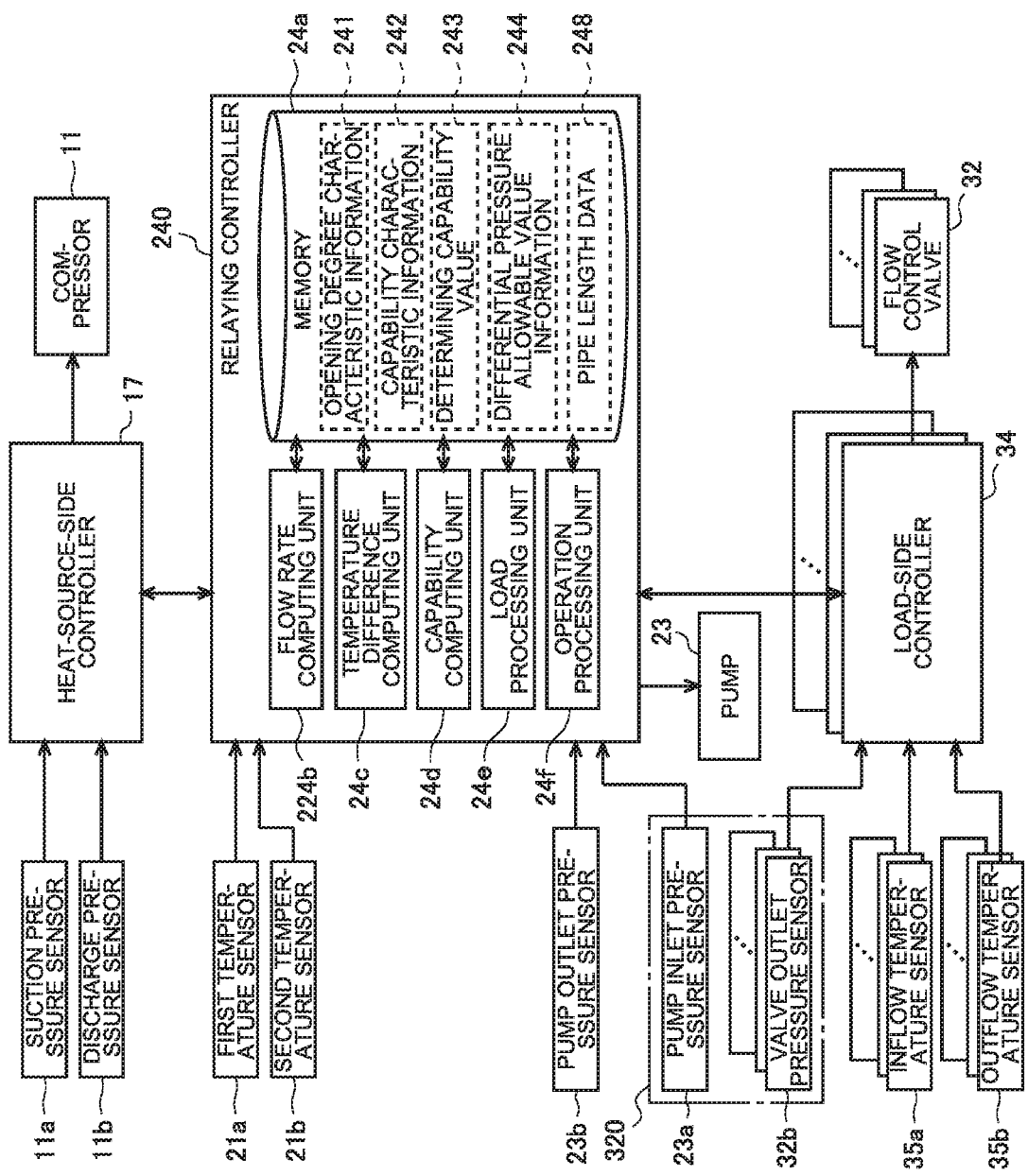
FIG. 10 is a block diagram showing a functional configuration of a relaying controller of FIG. 9.

FIG. 9 is a circuit diagram illustrating a configuration of an air-conditioning system according to Embodiment 2 of the present disclosure. FIG. 10 is a block diagram showing a functional configuration of a relaying controller of FIG. 9. Components that are equivalent to the components shown in FIGS. 1 and 2 are given the same reference signs, and a description of such components is omitted.

The aforementioned flow rate detection unit 320 of Embodiment 1 is formed by the valve inlet pressure sensor 32a and the valve outlet pressure sensor 32b. On the other hand, a flow rate detection unit 320 of an air-conditioning system 200 of Embodiment 2 is formed by a valve outlet pressure sensor 32b provided in each of the indoor units 30a to 30f and a pump inlet pressure sensor 23a. That is, in Embodiment 2, a valve outlet pressure and a pump inlet pressure are used as flow rate information. Therefore, the air-conditioning system 200 does not need the valve inlet pressure sensor 32a.

As shown in FIG. 10, the relaying controller 240 includes the memory 24a, a flow rate computing unit 224b, the temperature difference computing unit 24c, the capability computing unit 24d, the load processing unit 24e, and the operation processing unit 24f. The memory 24a stores pipe length data 248 that is information on the length of the heat medium pipe 61 to the pump inlet pressure sensor 23a from the valve outlet pressure sensor 32b in each of the indoor units 30a to 30f.

The flow rate computing unit 224b calculates, for each of the indoor units 30a to 30f, a pipe differential pressure value Δp that represents a differential pressure between a valve outlet pressure measured by the valve outlet pressure sensor 32b and a pump inlet pressure measured by the pump inlet pressure sensor 23a. Moreover, the flow rate computing unit 224b calculates the flow rate of a heat medium of each of the indoor units 30a to 30f using the pipe differential pressure value Δp and the pipe length data 248.

Figure 11:
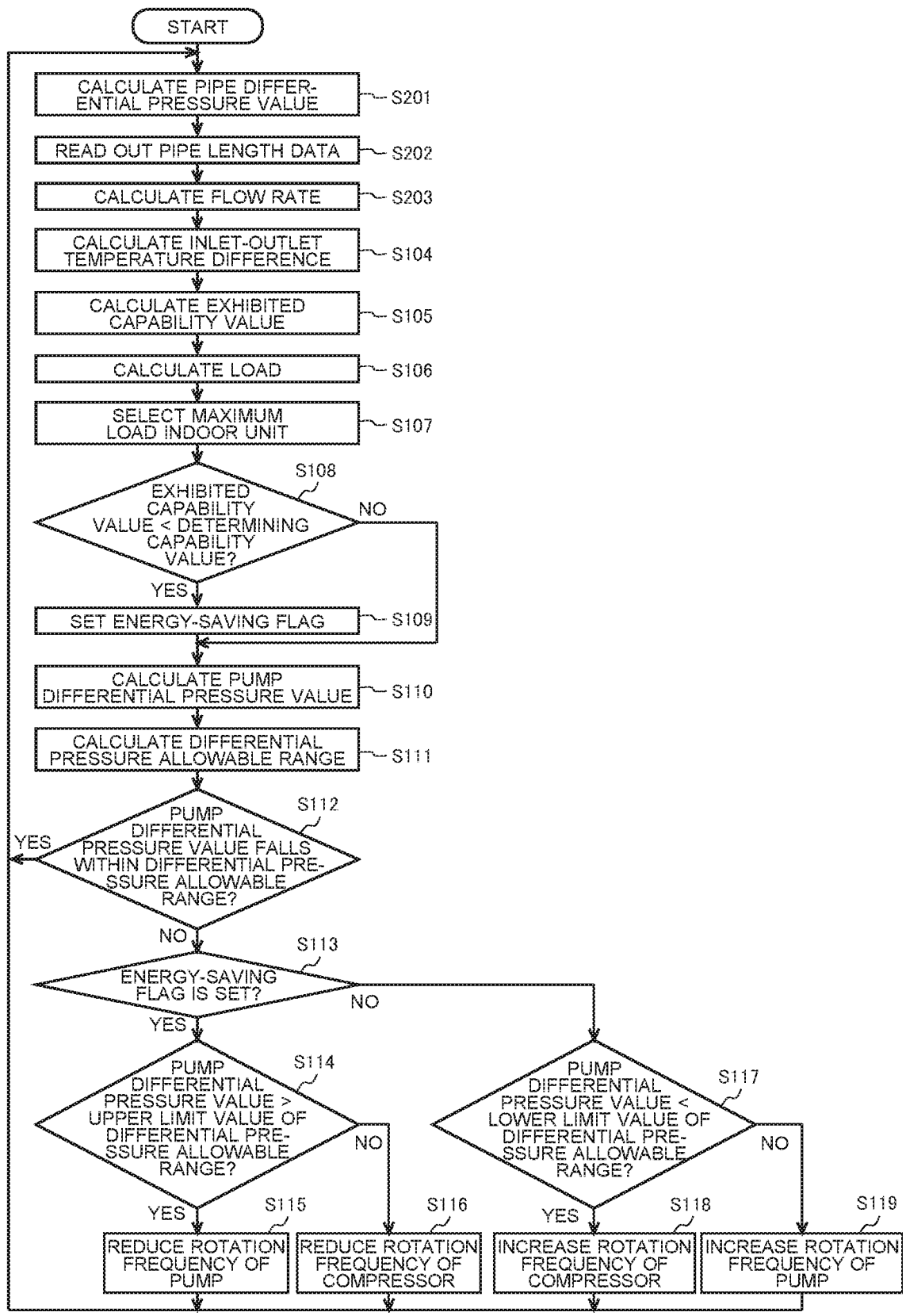
FIG. 11 is a flow chart showing an operation of the air-conditioning system of FIG. 9.

FIG. 11 is a flow chart showing an operation of the air-conditioning system of FIG. 9. The flow of an operation of energy-saving control, included in an air-conditioning control method executed by the air-conditioning system 200, that the relaying controller 240 exercises through the use of the flow rate information is described with reference to FIG. 11. Steps that are the same as the steps of FIG. 2 referred to in Embodiment 1 are given the same reference signs, and a description of such steps is omitted.

First, the flow rate computing unit 224b acquires a valve outlet pressure from the valve outlet pressure sensor 32b and acquires a pump inlet pressure from the pump inlet pressure sensor 23a. Then, the flow rate computing unit 224b calculates a pipe differential pressure value Δp, which represents the differential pressure between the valve outlet pressure and the pump inlet pressure (step S201). Further, the flow rate computing unit 224b reads out pipe length data 248 from the memory 24a for each of the indoor units 30a to 30f (step S202). Then, the flow rate computing unit 224b calculates the flow rate of a heat medium on the basis of the pipe differential pressure value Δp and the pipe length data 248 for each of the indoor units 30a to 30f.

For example, the memory 24a stores a flow rate derivation function whose variables are the pipe differential pressure value Δp and the pipe length data 248. The flow rate derivation function of Embodiment 2 is expressed by a mathematical formula (2) as shown below. "d [m]" denotes the diameter of the heat medium pipe 61, "f" denotes a coefficient of friction loss, and "ρ [kg/m³]" denotes the density of the heat medium. Further, "L [m]" denotes the length of the heat medium pipe 61 to the pump inlet pressure sensor 23a from the valve outlet pressure sensor 32b in each of the indoor units 30a to 30f. "S [m²]" denotes the cross-sectional area of the heat medium pipe 61. The length L of the heat medium pipe 61 to the pump inlet pressure sensor 23a from the valve outlet pressure sensor 32b in each of the indoor units 30a to 30f is contained in the pipe length data 248.

[Math. 2]

$$\text{Flow rate } [m^3/s] = \sqrt{\frac{2d \cdot \Delta p}{f \rho L}} \times S \qquad (2)$$

The flow rate computing unit 224b calculates the flow rate of a heat medium of each of the indoor units 30a to 30f by substituting the pipe differential pressure value Δp and the length L contained the pipe length data 248 into the flow rate derivation function for each of the indoor units 30a to 30f. The diameter d of the heat medium pipe 61, the coefficient of friction loss f, the density p of the heat medium, and the cross-sectional area S of the heat medium pipe 61 are stored in advance in the memory 24a (step S203). Next, as in the case of FIG. 2, the relaying controller 240 executes a series of steps S104 to S119.

As noted above, as is the case with the air-conditioning system 100, the air-conditioning system 200 of Embodiment 2 makes it possible to improve the accuracy of control in the whole system and achieve energy saving. Further, the air-conditioning system 200 calculates the flow rate of a heat medium of each of the indoor units 30a to 30f using the pipe differential pressure value Δp, which represents the differential pressure between the valve outlet pressure and the pump inlet pressure, and the pipe length data 248. This configuration eliminates the need to provide the valve inlet pressure sensor 32a, and it is thus possible to achieve a reduction in cost. Further, the step of calculating a Cv value is omitted, so that the process is simplified. It should be noted that each of the configurations of Modifications 1-1 to 1-3 of Embodiment 1 and a configuration based on a combination of the configurations of Modifications 1-1 to 1-3 of Embodiment 1 are also applicable to the air-conditioning system 200 of Embodiment 2.

Embodiment 3

Figure 12:
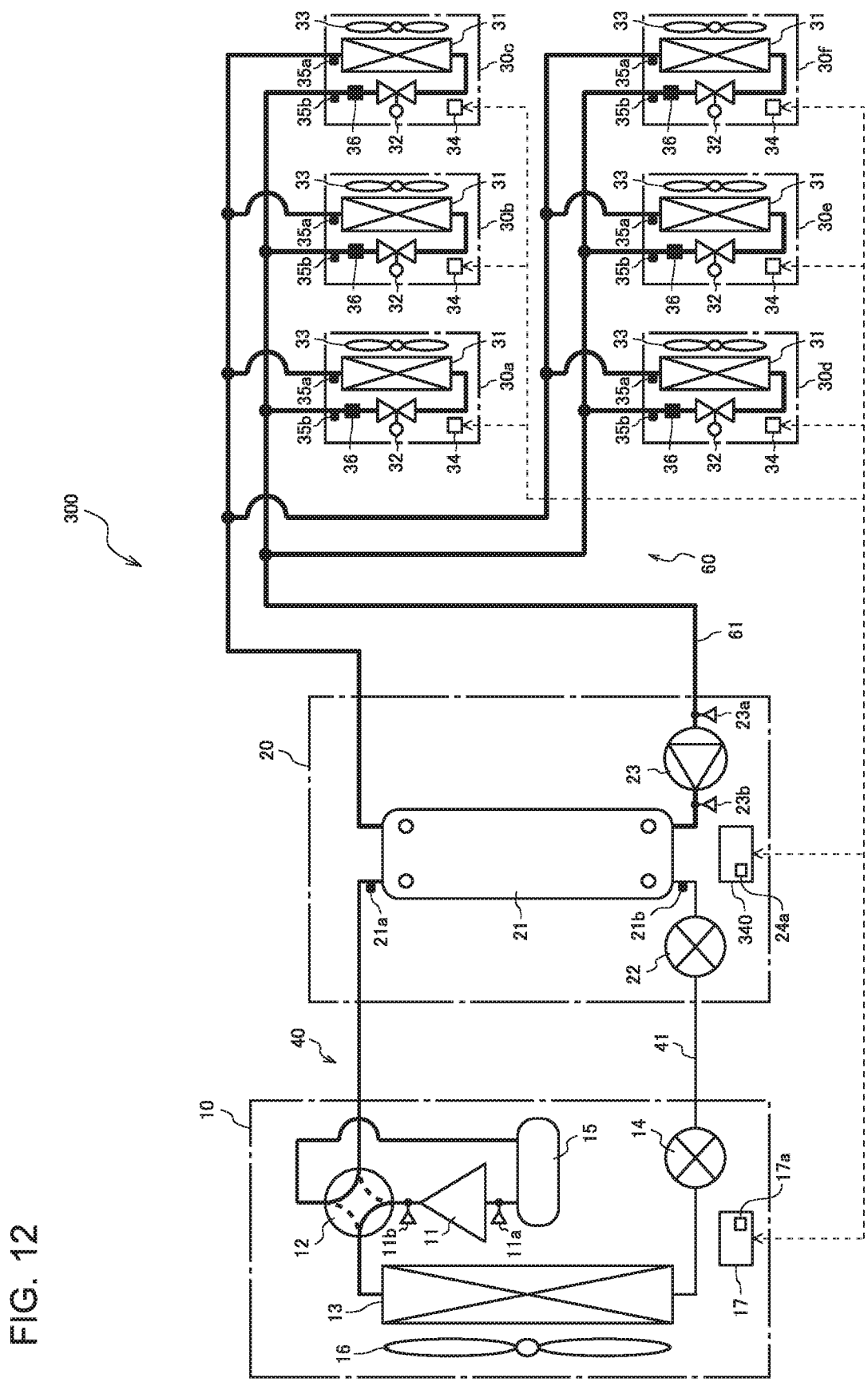
FIG. 12 is a circuit diagram illustrating a configuration of an air-conditioning system according to Embodiment 3 of the present disclosure.
Figure 13:
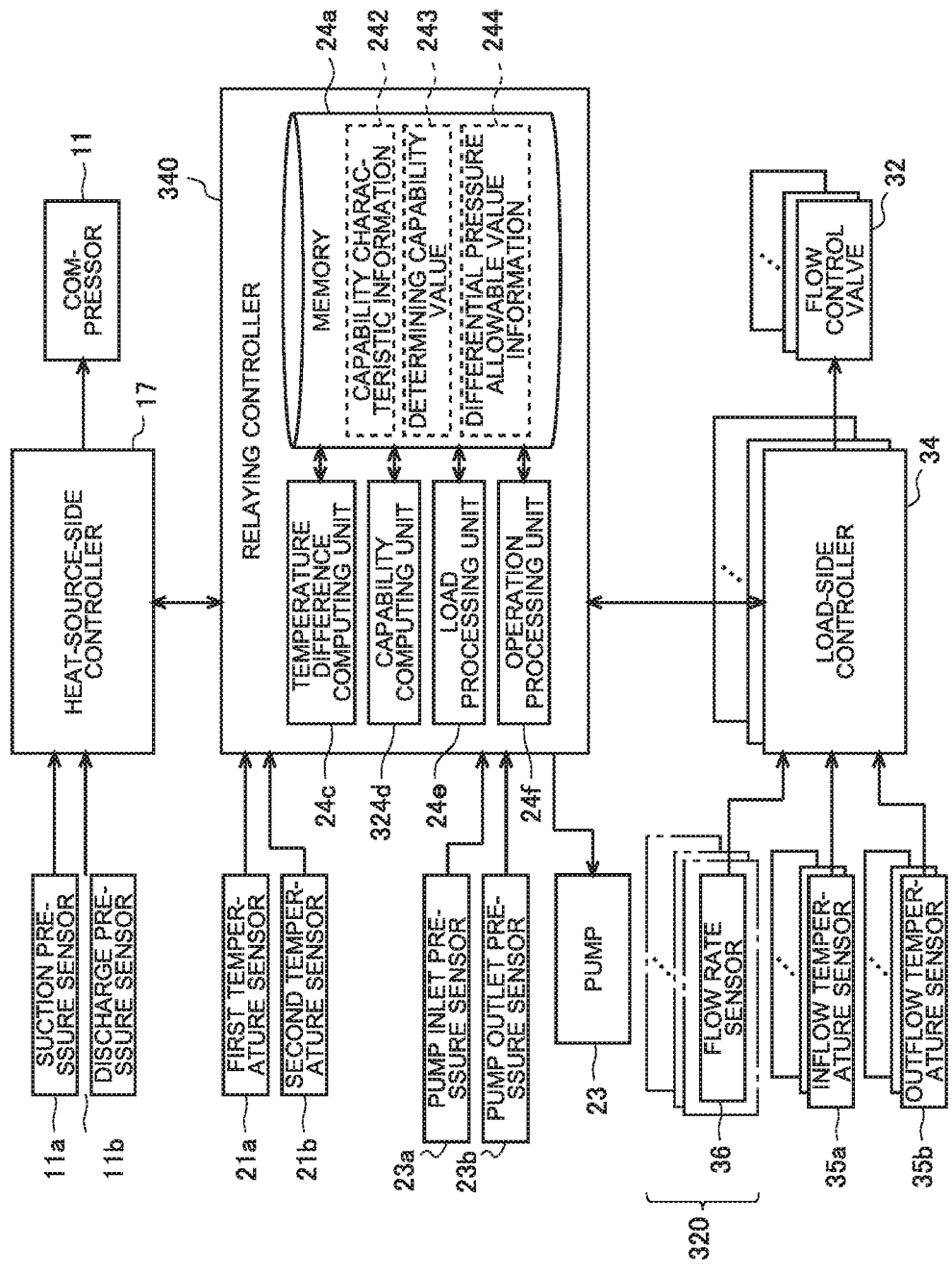
FIG. 13 is a block diagram showing a functional configuration of a relaying controller of FIG. 12.

FIG. 12 is a circuit diagram illustrating a configuration of an air-conditioning system according to Embodiment 3 of the present disclosure. FIG. 13 is a block diagram showing a functional configuration of a relaying controller of FIG. 12. Components that are equivalent to the components shown in FIGS. 1 and 2 are given the same reference signs, and a description of such components is omitted.

While the aforementioned flow rate detection units 320 of Embodiments 1 and 2 are each formed by two pressure sensors, a flow rate detection unit 320 of the air-conditioning system 300 of Embodiment 3 is formed by flow rate sensors 36 separately provided in the indoor units 30a to 30f. The flow rate sensor 36 of each of the indoor units 30a to 30f measures the flow rate of a heat medium that passes through the indoor unit and outputs the flow rate thus measured to the relaying controller 340 via the load-side controller 34. That is, in Embodiment 3, the flow rate measured by the flow rate sensor 36 is used as flow rate information. Therefore, the air-conditioning system 300 does not need the valve inlet pressure sensor 32a and the valve outlet pressure sensor 32b. Further, the memory 24a does not need to store the opening degree characteristic information 241.

Further, the flow rate sensor 36 is preferably provided downstream of the load-side heat exchanger 31, as shown in FIG. 12, to prevent a heat medium, for example, from rejecting heat before the heat medium flows into the load-side heat exchanger 31. Although FIG. 12 illustrates a case where the flow rate sensor 36 is provided downstream of the flow control valve 32, this is not intended to impose any limitation, and the flow rate sensor 36 may be provided between the load-side heat exchanger 31 and the flow control valve 32.

The relaying controller 340 includes the memory 24a, the temperature difference computing unit 24c, a capability computing unit 324d, the load processing unit 24e, and the operation processing unit 24f. The capability computing unit 324d calculates, using the flow rate detected by the flow rate sensor 36 and an inlet-outlet temperature difference calculated by the temperature difference computing unit 24c, an exhibited capability value that indicates a capability exhibited by each of the indoor units 30a to 30f. That is, the capability computing unit 324d calculates, as the exhibited capability value, the proportion of the flow rate detected by the flow rate sensor 36 to the maximum flow rate. Further, the capability computing unit 324d calculates a total flow rate value that is the total of the flow rates of heat media of the indoor units 30a to 30f and temporarily stores the total flow rate value in the memory 24a. In other respects, the configuration of the capability computing unit 324d is the same as the configuration of the aforementioned capability computing unit 24d.

Figure 14:
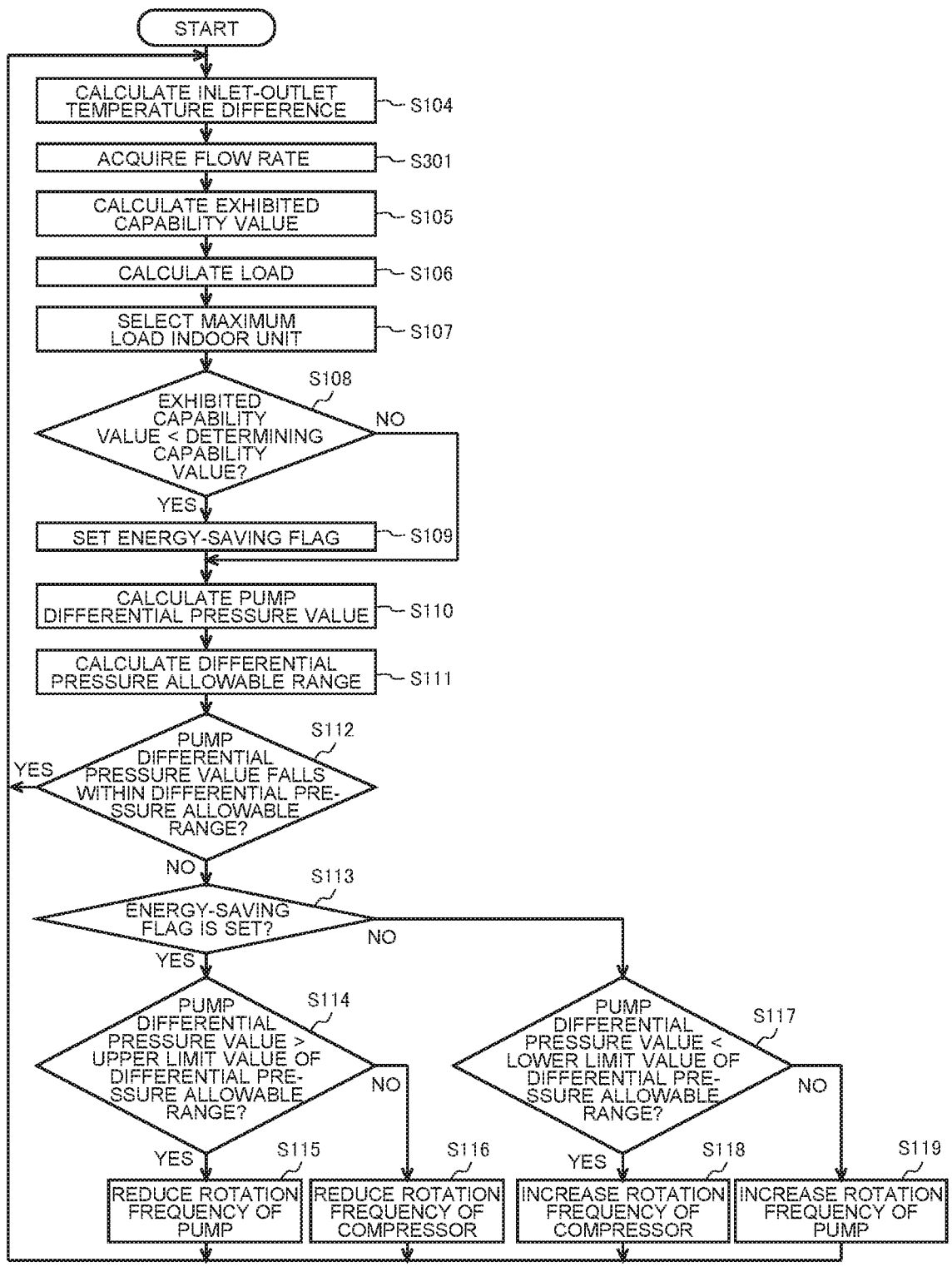
FIG. 14 is a flow chart showing an operation of the air-conditioning system of FIG. 12.

FIG. 14 is a flow chart showing an operation of the air-conditioning system of FIG. 12. The flow of an operation of energy-saving control, included in an air-conditioning control method executed by the air-conditioning system 300, that the relaying controller 340 exercises through the use of the flow rate information is described with reference to FIG. 14. Steps that are the same as the steps of FIG. 2 referred to in Embodiment 1 are given the same reference signs, and a description of such steps is omitted.

First, the temperature difference computing unit 24c calculates an inlet-outlet temperature difference that is a temperature difference between the inflow temperature and the outflow temperature (step S104). Next, the capability computing unit 324d acquires, from the flow rate sensor 36 of each of the indoor units 30a to 30f, the flow rate of a heat medium that flows through the indoor unit (step S301), Next, the capability computing unit 24d calculates the exhibited capability value of each of the indoor units 30a to 30f using the flow rate acquired from the flow rate sensor 36 and the inlet-outlet temperature difference calculated by the temperature difference computing unit 24c (step S105). Next, as in the case of FIG. 2, the relaying controller 340 executes a series of steps S106 to S119.

As noted above, as is the case with the air-conditioning systems 100 and 200, the air-conditioning system 300 of Embodiment 3 makes it possible to improve the accuracy of control in the whole system and achieve energy saving. Further, the air-conditioning system 300 includes, as the flow rate detection unit 320, the flow rate sensors 36, each of which calculates the flow rate of a heat medium of the corresponding one of the indoor units 30a to 30f. As the step of calculating a flow rate is omitted, the process is simplified and speeded up. In Embodiment 3, as the flow rate sensor 36 is provided downstream of the load-side heat exchanger 31, a heat medium can be prevented, for example, from rejecting heat at the flow rate sensor 36 before the heat medium flows into the load-side heat exchanger 31. Consequently, it is possible to prevent a decrease in heat exchange efficiency. It should be noted that each of the configurations of Modifications 1-1 to 1-3 of Embodiment 1 and a configuration based on a combination of the configurations of Modifications 1-1 to 1-3 of Embodiment 1 are also applicable to the air-conditioning system 300 of Embodiment 3.

Embodiment 4

Figure 15:
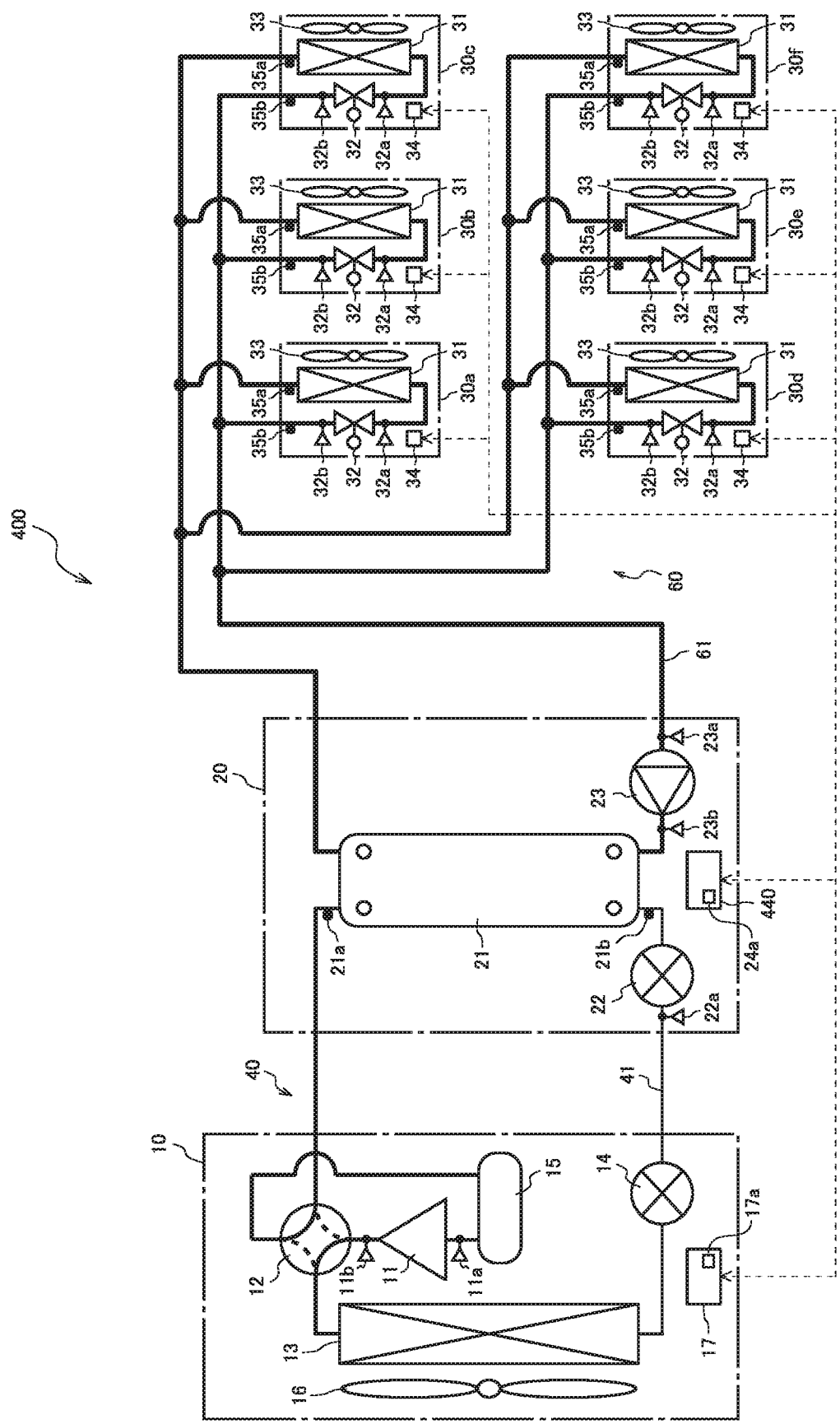
FIG. 15 is a circuit diagram illustrating a configuration of an air-conditioning system according to Embodiment 4 of the present disclosure.
Figure 16:
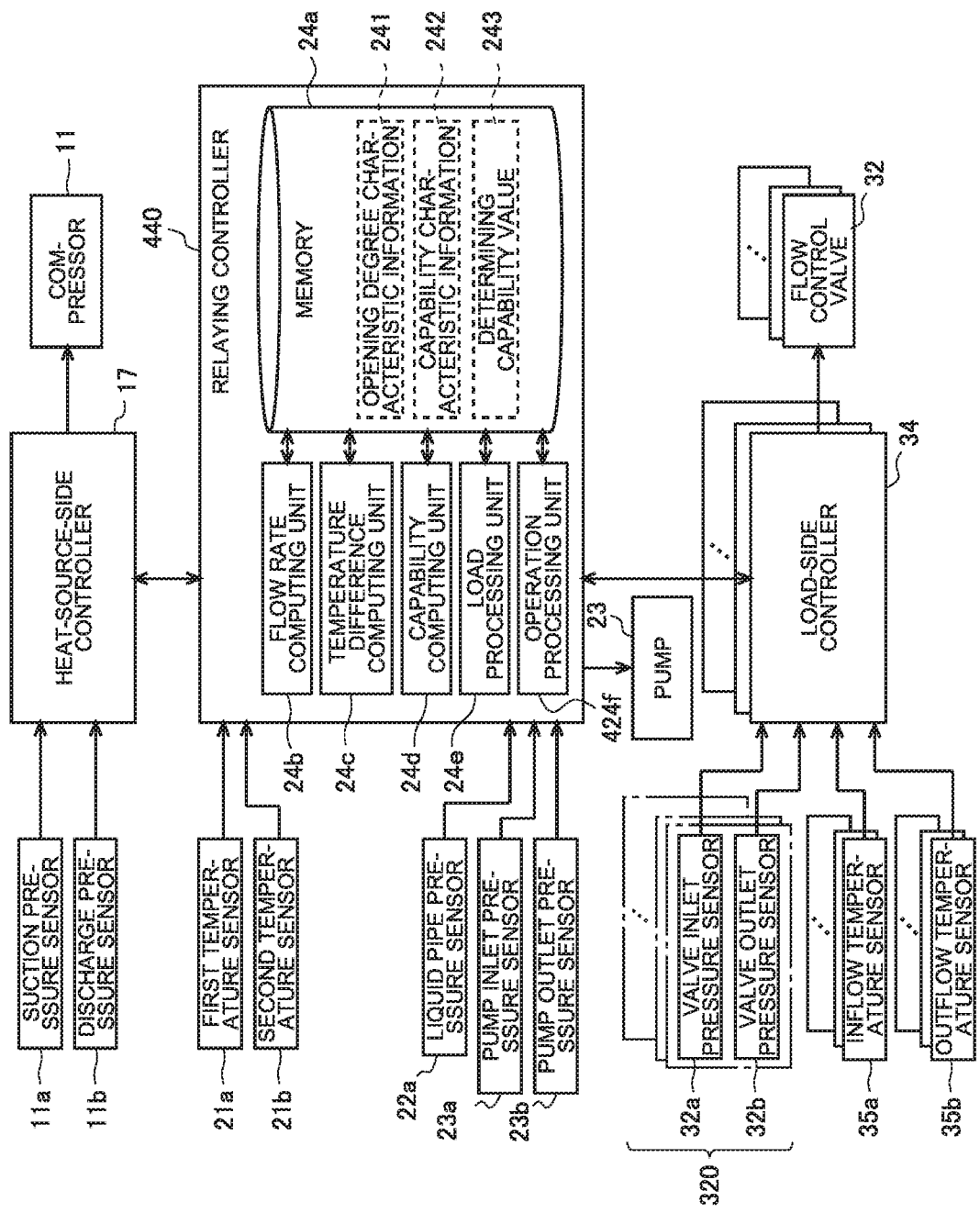
FIG. 16 is a block diagram showing a functional configuration of a relaying controller of FIG. 15.

FIG. 15 is a circuit diagram illustrating a configuration of an air-conditioning system according to Embodiment 4 of the present disclosure. FIG. 16 is a block diagram showing a functional configuration of a relaying controller of FIG. 15.

Components that are equivalent to the components shown in FIGS. 1 and 2 are given the same reference signs, and a description of such components is omitted.

The relay device 20 is provided with a liquid pipe pressure sensor 22*a*. The liquid pipe pressure sensor 22*a* is provided opposite the intermediate heat exchanger 21 across the relaying expansion device 22 and measures a liquid pipe pressure that is the pressure of refrigerant that flows through the refrigerant pipe 41. In Embodiment 4, the liquid pipe pressure sensor 22*a* is provided between the heat-source-side expansion device 14 and the relaying expansion device 22 and measures a liquid pipe pressure that is the pressure of refrigerant that flows through a portion of the refrigerant pipe 41 between the heat-source-side expansion device 14 and the relaying expansion device 22.

An operation processing unit 424*f* calculates a first pressure loss based on a pressure loss in an outward path of the heat medium circuit 60. More specifically, the operation processing unit 424*f* calculates a heat medium pipe pressure loss that represents a differential pressure between the pump outlet pressure measured by the pump outlet pressure sensor 23*b* and the valve inlet pressure measured by the valve inlet pressure sensor 32*a*. Then, the operation processing unit 424*f* calculates the first pressure loss by multiplying the heat medium side pressure loss by a first conversion factor.

Further, the operation processing unit 424*f* calculates a second pressure loss based on a pressure loss in an outward path of the refrigerant circuit 40. More specifically, the operation processing unit 424*f* calculates a refrigerant pipe pressure loss that represents a differential pressure between the discharge pressure Pd measured by the discharge pressure sensor 11*b* and the liquid pipe pressure measured by the liquid pipe pressure sensor 22*a*. Then, the operation processing unit 424*f* calculates the second pressure loss by multiplying the refrigerant pipe pressure loss by a second conversion factor.

Note here that the first conversion factor and the second conversion factor are conversion factors for comparing the pressure loss in the outward path of the heat medium circuit 60 and the pressure loss in the outward path of the refrigerant circuit 40 at the same level, and are based on the configuration of the air-conditioning system 400, the environment of installation of the air-conditioning system 400, or other conditions. Of course, only either the first conversion factor or the second conversion factor may be stored in the memory 24*a*, and one of the heat medium pipe pressure loss and the refrigerant pipe pressure loss may be converted into a value of the same level as the level of the other.

In a case where the energy-saving flag is set, the operation processing unit 424*f* reduces the rotation frequency of the pump 23 when the first pressure loss is larger than the second pressure loss. Further, in a case where the energy-saving flag is set, the operation processing unit 424*f* reduces the rotation frequency of the compressor 11 when the first pressure loss is smaller than the second pressure loss. That is, in a case where the energy-saving flag is set, the operation processing unit 424*f* reduces the flow rate of one of the heat medium circuit 60 and the refrigerant circuit 40 that is larger in pressure loss than the other.

In a case where the energy-saving flag is not set, the operation processing unit 424*f* increases the rotation frequency of the compressor 11 when the first pressure loss is larger than the second pressure loss. Further, in a case where the energy-saving flag is not set, the operation processing unit 424*f* reduces the rotation frequency of the pump 23 when the first pressure loss is smaller than the second pressure loss. That is, in a case where the energy-saving flag is not set, the operation processing unit 424*f* increases the flow rate of one of the heat medium circuit 60 and the refrigerant circuit 40 that is smaller in pressure loss than the other.

Figure 17:
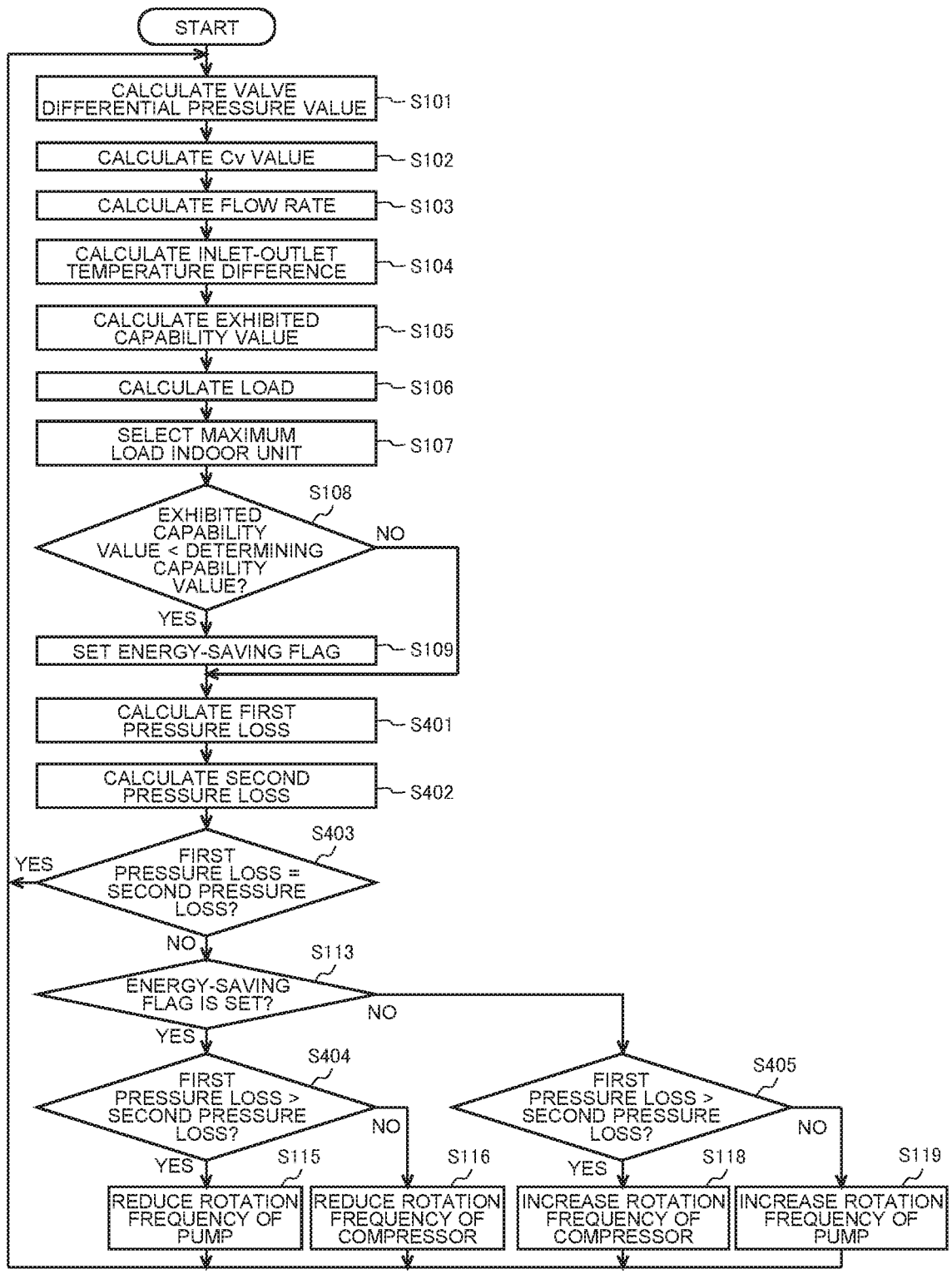
FIG. 17 is a flow chart showing an operation of the air-conditioning system of FIG. 12.

FIG. 17 is a flow chart showing an operation of the air-conditioning system of FIG. 12. The flow of an operation of energy-saving control, included in an air-conditioning control method executed by the air-conditioning system 400, that the relaying controller 440 exercises through the use of the flow rate information is described with reference to FIG. 17. Steps that are the same as the steps of FIG. 2 referred to in Embodiment 1 are given the same reference signs, and a description of such steps is omitted.

First, as in the case of FIG. 2, the relaying controller 440 executes a series of steps S101 to S109. Next, the operation processing unit 424*f* acquires a pump outlet pressure from the pump outlet pressure sensor 23*b* and acquires a valve inlet pressure from the valve inlet pressure sensor 32*a*. Then, the operation processing unit 424*f* calculates the first pressure loss from the pump outlet pressure and the valve inlet pressure (step S401).

Further, the operation processing unit 424*f* acquires the discharge pressure Pd from the discharge pressure sensor 11*b* and acquires a liquid pipe pressure from the liquid pipe pressure sensor 22*a*. Then, the operation processing unit 424*f* calculates the second pressure loss from the discharge pressure Pd and the liquid pipe pressure (step S402).

Next, the operation processing unit 424*f* compares the first pressure loss with the second pressure loss and, when the first pressure loss and the second pressure loss are equal (YES in step S403), returns the process to step S101. In a case where there is a difference between the first pressure loss and the second pressure loss (NO in step S403), the operation processing unit 424*f* checks whether the energy-saving flag is set (step S113).

When the energy-saving flag is set (YES in step S113) and when the first pressure loss is larger than the second pressure loss (YES in step S404), the operation processing unit 424*f* reduces the rotation frequency of the pump 23 (step S115), When the energy-saving flag is set (YES in step S113) and when the first pressure loss is smaller than the second pressure loss (NO in step S404), the operation processing unit 424*f* reduces the rotation frequency of the compressor 11 (step S116).

When the energy-saving flag is not set (NO in step S113) and when the first pressure loss is larger than the second pressure loss (YES in step S405), the operation processing unit 424*f* increases the rotation frequency of the compressor 11 (step S118). When the energy-saving flag is not set (NO in step S113) and when the first pressure loss is smaller than the second pressure loss (NO in step S405), the operation processing unit 424*f* increases the rotation frequency of the pump 23 (step S119).

As noted above, as is the case with the air-conditioning systems 100, 200, and 300, the air-conditioning system 400 of Embodiment 4 makes it possible to improve the accuracy of control in the whole system and achieve energy saving. Further, the air-conditioning system 400 is configured to compare the operating status of the compressor 11 in the refrigerant circuit 40 with the operating status of the pump 23 in the heat medium circuit 60 on the basis of the respective pressure losses of the circuits and apply a result of the comparison to the contents of control of the compressor 11 and the pump 23. Consequently, it is possible to feed back the operating status of the whole system to the air-conditioning system 400 for the control of the compressor 11 and the pump 23. Moreover, in a case where the exhibited capability value of the maximum load indoor unit is less than the determining capability value 243, the air-conditioning system 400 reduces the rotation frequency of the pump 23 when the first pressure loss is larger than the second pressure loss or reduces the rotation frequency of the compressor 11 when the first pressure loss is smaller than the second pressure loss. Consequently, it is possible to achieve energy saving appropriate to the operating status of the whole system. It should be noted that each of the configurations of Modifications 1-1 to 1-3 of Embodiment 1 and a configuration based on a combination of the configurations of Modifications 1-1 to 1-3 of Embodiment 1 are also applicable to the air-conditioning system 400 of Embodiment 4.

<Modification 4-1>

Figure 18:
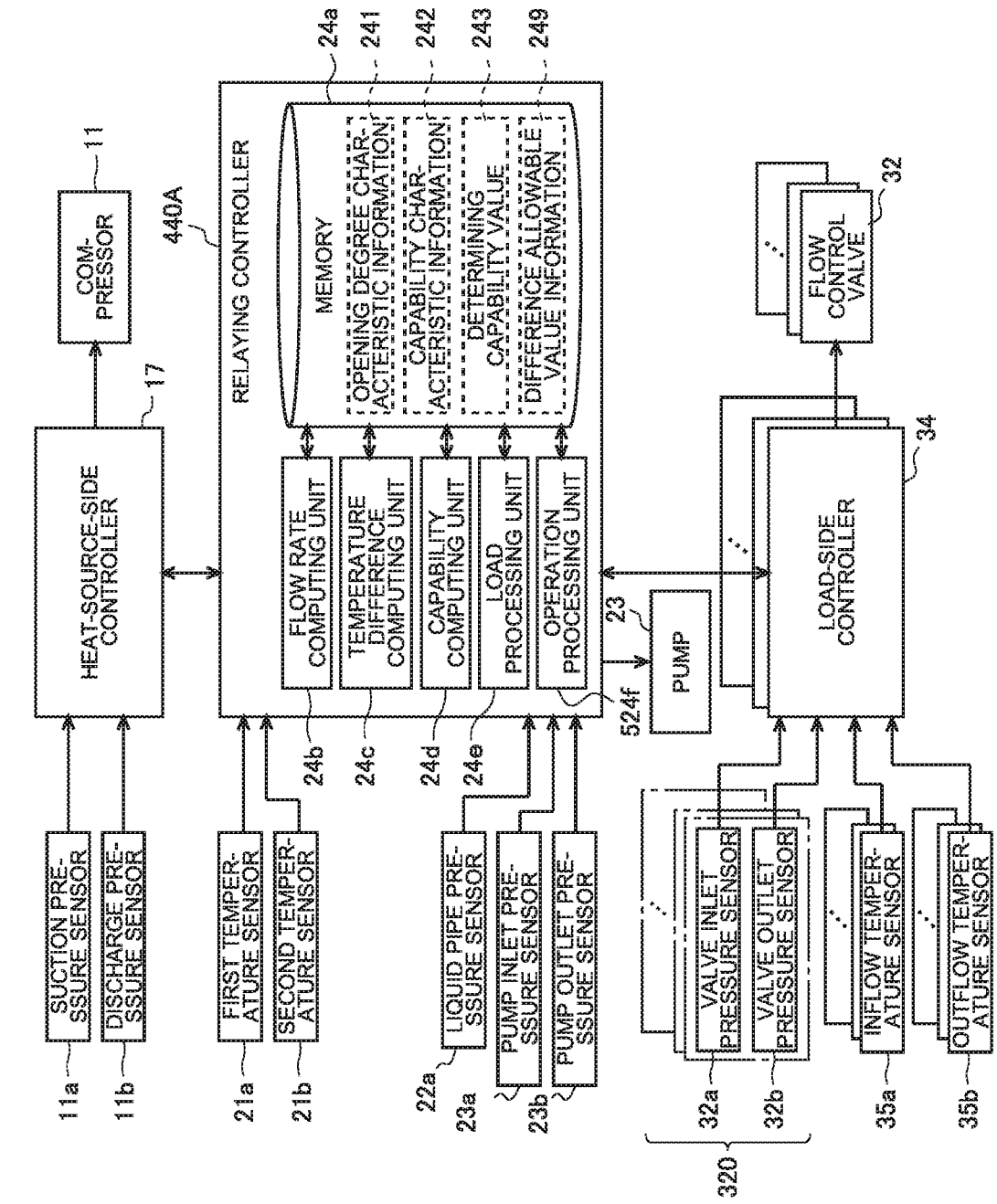
FIG. 18 is a block diagram showing a functional configuration of a relaying controller of an air-conditioning system according to Modification 4-1 of Embodiment 4 of the present disclosure.

FIG. 18 is a block diagram showing a functional configuration of a relaying controller of an air-conditioning system according to Modification 4-1 of Embodiment 4 of the present disclosure. Note here that when there is a difference between the first pressure loss and the second pressure loss, the aforementioned operation processing unit 424f changes the rotation frequency of either the compressor 11 or the pump 23, However, in terms of stability of control, it is preferable that the rotation frequencies of the compressor 11 and the pump 23 be maintained even when the first pressure loss and the second pressure loss are not completely equal, as long as the difference between the first pressure loss and the second pressure loss falls within a certain range. Therefore, the air-conditioning system 400 of Modification 4-1 achieves stability of control with the following configuration. Components that are equivalent to the components shown in FIGS. 15 and 16 are given the same reference signs, and a description of such components is omitted.

As shown in FIG. 18, the relaying controller 440A of the air-conditioning system 400 of Modification 4-1 includes the memory 24a, the flow rate computing unit 24b, the temperature difference computing unit 24c, the capability computing unit 24d, the load processing unit 24e, and an operation processing unit 524f. The memory 24a stores difference allowable value information 249 that is information on an allowable range of differences between the first pressure loss and the second pressure loss.

Figure 19:
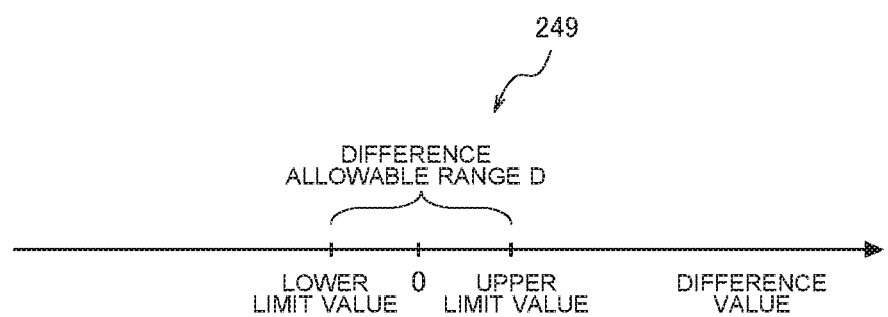
FIG. 19 is a conceptual diagram for explaining difference allowable value information stored in a memory of FIG. 18.

FIG. 19 is a conceptual diagram for explaining the difference allowable value information stored in the memory of FIG. 18. As shown in FIG. 19, the difference allowable value information 249 contains a difference allowable range D that indicates the allowable range of differences between the first pressure loss and the second pressure loss. The difference allowable range D is a range that allows the compressor 11 and the pump 23 to maintain their respective rotation frequencies. The difference allowable range is set within a range from a lower limit value that is a negative number to an upper limit value that is a positive number. The lower limit value and the upper limit value are set on the basis of the configuration of the air-conditioning system 400, the environment of installation of the air-conditioning system 400, or other conditions, and can be changed as appropriate.

In Modification 4-1, the operation processing unit 524f calculates a difference value by subtracting the second pressure loss from the first pressure loss. Accordingly, when the difference value is a positive number, the first pressure loss is larger than the second pressure, and when the difference value is a negative number, the first pressure loss is smaller than the second pressure loss.

Moreover, when the difference value falls within the difference allowable range D, the operation processing unit 524f maintains the rotation frequencies of the compressor 11 and the pump 23. In a case where the energy-saving flag is set, the operation processing unit 524f reduces the rotation frequency of the pump 23 when the difference value is larger than the upper limit value of the difference allowable range D. Further, in a case where the energy-saving flag is set, the operation processing unit 524f reduces the rotation frequency of the compressor 11 when the difference value is smaller than the lower limit value of the difference allowable range D.

In a case where the energy-saving flag is not set, the operation processing unit 524f increases the rotation frequency of the compressor 11 when the difference value is larger than the upper limit value of the difference allowable range D. Further, in a case where the energy-saving flag is not set, the operation processing unit 524f increases the rotation frequency of the pump 23 when the difference value is smaller than the lower limit value of the difference allowable range D.

Figure 20:
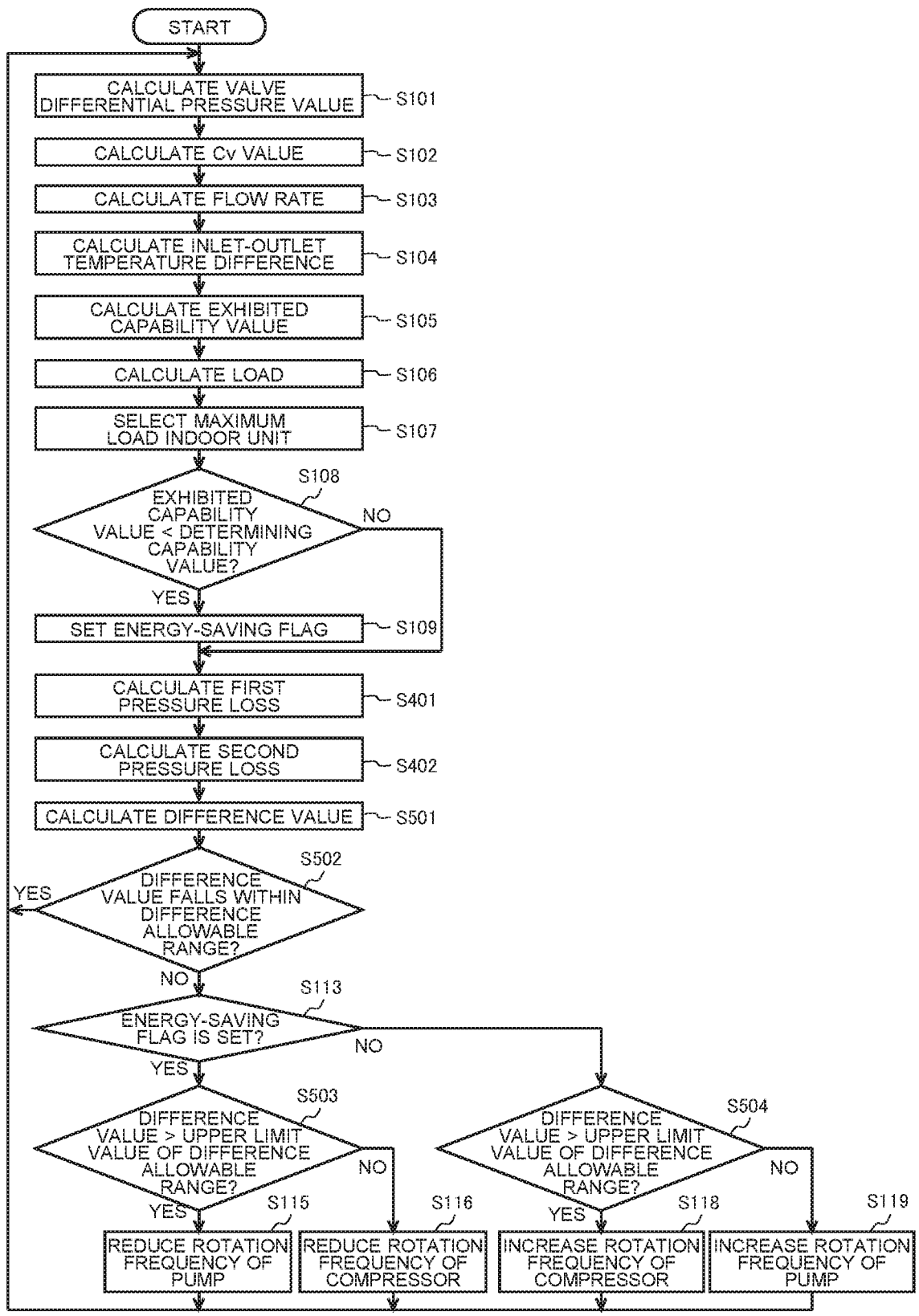
FIG. 20 is a flow chart showing an operation of the air-conditioning system according to Modification 4-1 of Embodiment 4 of the present disclosure.

FIG. 20 is a flow chart showing an operation of the air-conditioning system according to Modification 4-1 of Embodiment 4 of the present disclosure. The flow of an operation of energy-saving control that the relaying controller 440A exercises through the use of flow rate information is described with reference to FIG. 20. Steps that are the same as the steps of FIG. 20 are given the same reference signs, and a description of such steps is omitted.

First, as in the case of FIG. 2, the relaying controller 440A executes a series of steps S101 to S109. Next, as in the case of FIG. 10, the operation processing unit 524f calculates the first pressure loss and the second pressure loss (step S401, step S402).

Next, the operation processing unit 524f calculates a difference value by subtracting the second pressure loss from the first pressure loss (step S501). When the difference value falls within the difference allowable range D (YES in step S502), the operation processing unit 524f returns the process to step S101. When the difference value is out of the difference allowable range D (NO in step S502), the operation processing unit 524f checks whether the energy-saving flag is set (step S113).

When the energy-saving flag is set (YES in step S113) and when the difference value is larger than the upper limit value of the difference allowable range D (YES in step S503), the operation processing unit 424f reduces the rotation frequency of the pump 23 (step S115). When the energy-saving flag is set (YES in step S113) and when the difference value is smaller than the lower limit value of the difference allowable range D (NO in step S503), the operation processing unit 524f reduces the rotation frequency of the compressor 11 (step S116).

When the energy-saving flag is not set (NO in step S113) and when the difference value is larger than the upper limit value of the difference allowable range D (YES in step S504), the operation processing unit 524f increases the rotation frequency of the compressor 11 (step S118). When the energy-saving flag is not set (NO in step S113) and when the difference value is smaller than the lower limit value of the difference allowable range D (NO in step S504), the operation processing unit 524f increases the rotation frequency of the pump 23 (step S119).

As noted above, the air-conditioning system 400 of Modification 4-1 determines the contents of control of the compressor 11 and the pump 23 by comparing a difference value with the difference allowable range D. Therefore, when the difference between the first pressure loss and the second pressure loss falls within a certain range, the rotation frequencies of the compressor 11 and the pump 23 can be maintained. Moreover, in a case where the exhibited capability value of the maximum load indoor unit is less than the determining capability value 243, the rotation frequency of the pump 23 is reduced when the difference value is larger than the upper limit value of the difference allowable range D or the rotation frequency of the compressor 11 is reduced when the difference value is smaller than the lower limit value of the difference allowable range D. Consequently, it is possible to reduce hunting, and it is thus possible to achieve stability of control and achieve energy saving. It should be noted that each of the configurations of Modifications 1-1 to 1-3 of Embodiment 1 and a configuration based on a combination of the configurations of Modifications 1-1 to 1-3 of Embodiment 1 are also applicable to the air-conditioning system 400 of Modification 4-1.

Each of the embodiments described above is a preferred specific example of an air-conditioning system, and the technical scope of the present disclosure is not limited to these aspects. For example, although each of the embodiments described above has illustrated the heat-source device 10, which is configured to supply both cooling energy and heating energy by switching the flows of refrigerant with the four-way valve 12, this is not intended to impose any limitation. The heat-source device 10 may be configured without the provision of the four-way valve 12 to supply either cooling energy or heating energy. That is, the air-conditioning system of each of the embodiments described above may perform either cooling operation or heating operation. Further, the air-conditioning system of each of the embodiments described above may perform simultaneous cooling and heating operation in which the operating status of each indoor unit is individually switched.

Further, although each of the embodiments described above has illustrated a case where the air-conditioning system includes six indoor units, this is not intended to impose any limitation. The air-conditioning system may include five or less indoor units or may include seven or more indoor units. Furthermore, although each of the embodiments described above has illustrated a case where the relaying controller exercises overall control of the air-conditioning system, this is not intended to impose any limitation, and the overall control of the air-conditioning system may be exercised by the heat-source-side controller.

In addition, the flow rate detection unit 320 may be the load-side controller 34 of each of the indoor units 30a to 30f. That is, the flow rate information may be the opening degree of the flow control valve 32 detected by the load-side controller 34. In this case, for each of the indoor units 30a to 30f, flow rate conversion data that associates the opening degree of the flow control valve 32 with the flow rate of a heat medium is stored in advance in the memory 24a. Moreover, the flow rate computing unit of each embodiment compares, with the flow rate conversion data, an opening degree acquired from the load-side controller 34 of each of the indoor units 30a to 30f and thereby calculates the flow rate of a heat medium that flows through the indoor unit.

REFERENCE SIGNS LIST 10 heat-source device 11 compressor 11a suction pressure sensor 11b discharge pressure sensor 12 four-way valve 13 heat-source-side heat exchanger 14 heat-source-side expansion device 15 accumulator 16 heat-source-side fan 17 heat-source-side controller 17a, 24a memory 20 relay device 21 intermediate heat exchanger 21a first temperature sensor 21b second temperature sensor 22 relaying expansion device 22a liquid pipe pressure sensor 23 pump 23a pump inlet pressure sensor 23b pump outlet pressure sensor 24, 24A to 24O, 240, 340, 440, 440A relaying controller 24b, 124b, 224b flow rate computing unit 24c temperature difference computing unit 24d, 124d, 324d capability computing unit 24e load processing unit 24f, 124f, 424f, 524f operation processing unit 30a to 30f indoor unit 31 load-side heat exchanger 32 flow control valve 32a valve inlet pressure sensor 32b valve outlet pressure sensor 33 load-side fan 34 load-side controller 35a inflow temperature sensor 35b outflow temperature sensor 36 flow rate sensor 40 refrigerant circuit 60 heat medium circuit 61 heat medium pipe 100, 100A, 200, 300, 400 air-conditioning system 124g abnormality determination unit 241 opening degree characteristic information 242 capability characteristic information 243 determining capability value 244 differential pressure allowable value information 245 maximum flow rate information 246 pump capability information 247 pump flow rate information 248 pipe length data 249 difference allowable value information 320 flow rate detection unit

The invention claimed is:
1. An air-conditioning system, comprising:
a heat-source device that includes a compressor and a heat-source-side heat exchanger;
a relay device that includes a pump and an intermediate heat exchanger;
a plurality of indoor units that each include a load-side heat exchanger;
a refrigerant circuit, formed by the compressor, the heat-source-side heat exchanger, and the intermediate heat exchanger that are connected to one another via a refrigerant pipe, through which refrigerant circulates;
a heat medium circuit, formed by the pump, the intermediate heat exchanger, and the load-side heat exchanger of each of the plurality of indoor units that are connected to one another via a heat medium pipe, through which a heat medium circulates;
a plurality of flow rate detection units provided to the plurality of indoor units, each flow rate detection unit being configured to detect flow rate information associated with a flow rate of a heat medium that flows through a corresponding indoor unit; and
a controller configured to control operation of at least either the compressor or the pump on a basis of the flow rate information associated with each of the plurality of indoor units as detected by the plurality of flow rate detection units, wherein
the controller includes:
a memory configured to store a determining capability value used as a criterion for determining a rotation frequency of at least either the compressor or the pump,
a capability computing unit configured to calculate, on a basis of the flow rate information, an exhibited capability value that indicates a capability exhibited by each of the plurality of indoor units, a load processing unit configured to
calculate a load using the exhibited capability value for each of the plurality of indoor units and
select, as a maximum load indoor unit, an indoor unit with a highest load of the plurality of indoor units, and an operation processing unit configured to reduce the rotation frequency of at least either the compressor or the pump in a case where the exhibited capability value of the maximum load indoor unit is less than the determining capability value.

2. The air-conditioning system of claim 1, wherein:
each of the plurality of indoor units includes a flow control valve configured to adjust a flow rate of a heat medium that flows through the load-side heat exchanger included in a corresponding indoor unit,
each flow rate detection unit includes a valve outlet pressure sensor configured to measure a valve outlet pressure that is a pressure at an outlet of a corresponding flow control valve, and
the relay device is provided with a pump inlet pressure sensor is-configured to measure a pump inlet pressure that is a pressure at an inlet of the pump.

3. The air-conditioning system of claim 2, wherein:
the controller includes a flow rate computing unit configured to
calculate a pipe differential pressure value that represents a differential pressure between the valve outlet pressure and the pump inlet pressure and
calculate, using the pipe differential pressure value, the flow rate of a heat medium that flows through each of the plurality of indoor units, and
the capability computing unit is configured to calculate the exhibited capability value of each of the plurality of indoor units using the flow rate calculated by the flow rate computing unit.

4. The air-conditioning system of claim 3, wherein:
the memory stores pipe length data that is information on a length of the heat medium pipe from the valve outlet pressure sensor to the pump inlet pressure sensor for each of the plurality of indoor units, and
the flow rate computing unit is configured to calculate the flow rate of a heat medium of each of the plurality of indoor units using the pipe differential pressure value and the pipe length data.

5. The air-conditioning system of claim 1, wherein:
each of the plurality of indoor units includes a flow control valve configured to adjust a flow rate of a heat medium that flows through the load-side heat exchanger included in a corresponding indoor unit, and
each flow rate detection unit further includes a flow rate sensor configured to measure the flow rate of a heat medium that passes through a corresponding indoor unit.

6. The air-conditioning system of claim 5, wherein
the capability computing unit is configured to calculate the exhibited capability value of each of the plurality of indoor units using the flow rate measured by the flow rate sensor included in a corresponding indoor unit.

7. The air-conditioning system of claim 1, wherein
in a case where the exhibited capability value of the maximum load indoor unit is less than the determining capability value, the operation processing unit is configured to reduce the rotation frequency of the pump when a pump differential pressure value is larger than an upper limit value of a differential pressure allowable range, or reduce the rotation frequency of the compressor when the pump differential pressure value is smaller than a lower limit value of the differential pressure allowable range, the pump differential pressure value representing an inlet-outlet differential pressure of the pump, and the differential pressure allowable range being a range that allows the compressor to maintain the rotation frequency and that allows the pump to maintain the rotation frequency.

8. The air-conditioning system of claim 7, wherein:
the capability computing unit is configured to calculate a total capability value that is a sum of the respective exhibited capability values of the plurality of indoor units,
the memory stores differential pressure allowable value information that associates the total capability value with the differential pressure allowable range, and
the operation processing unit is configured to calculate the differential pressure allowable range by comparing the total capability value calculated by the capability computing unit with the differential pressure allowable value information.

9. The air-conditioning system of claim 7, wherein:
the memory stores
pump capability information that associates the pump differential pressure value with a pump capability value that indicates a capability of the pump and
differential pressure allowable value information that associates the pump capability value with the differential pressure allowable range, and
the operation processing unit is configured to
calculate the pump capability value by comparing the pump differential pressure value with the pump capability information and
calculate the differential pressure allowable range by comparing the pump capability value thus calculated with the differential pressure allowable value information.

10. The air-conditioning system of claim 7, wherein:
the memory stores pump flow rate information that associates the pump differential pressure value with a pump discharge flow rate value that indicates the flow rate of a heat medium that is discharged by the pump, and
the controller includes an abnormality determination unit configured to
calculate the pump discharge flow rate value by comparing the pump differential pressure value with the pump flow rate information and
transmit, in a case where a flow rate proportion is out of a range from a lower limit proportion to an upper limit proportion set to be larger than the lower limit proportion, an abnormality occurrence signal to at least one of the plurality of indoor units,
the flow rate proportion being a proportion of a total flow rate value to the pump discharge flow rate value, and
the total flow rate value representing a total of the flow rates of heat media of the plurality of indoor units, the abnormality occurrence signal indicating an occurrence of an abnormality.

11. The air-conditioning system of claim 1, wherein:
the memory stores a maximum capability value of a maximum capability that each of the plurality of indoor units is configured to exhibit, and
the load processing unit is configured to calculate a load of each of the plurality of indoor units from a proportion of the exhibited capability value to the maximum capability value.

12. The air-conditioning system of claim 1, wherein
each of the plurality of indoor units includes a flow control valve configured to adjust a flow rate of a heat medium that flows through the load-side heat exchanger included in a corresponding indoor unit, and
each flow rate detection unit includes
a valve inlet pressure sensor configured to measure a valve inlet pressure that is a pressure at an inlet of a corresponding flow control valve, and
a valve outlet pressure sensor configured to measure a valve outlet pressure that is a pressure at an outlet of a corresponding flow control valve.

13. The air-conditioning system of claim 12, wherein
the controller includes a flow rate computing unit configured to
calculate a valve differential pressure value that represents a differential pressure between the valve inlet pressure and the valve outlet pressure and
calculate, using the valve differential pressure value, the flow rate of a heat medium that flows through each of the plurality of indoor units, and
the capability computing unit is configured to calculate the exhibited capability value of each of the plurality of indoor units using the flow rate calculated by the flow rate computing unit.

14. The air-conditioning system of claim 12, further comprising:
an inflow temperature sensor configured to measure an inflow temperature that is a temperature of a heat medium that flows into each of the plurality of indoor units; and
an outflow temperature sensor configured to measure an outflow temperature that is a temperature of a heat medium that flows out from each of the plurality of indoor units, wherein
the controller includes a temperature difference computing unit configured to calculate an inlet-outlet temperature difference that is a temperature difference between the inflow temperature measured by one of the inflow temperature sensors and the outflow temperature measured by a corresponding outflow temperature sensor, and
the capability computing unit is configured to calculate the exhibited capability value of each of the plurality of indoor units using the flow rate and the inlet-outlet temperature difference.

15. The air-conditioning system of claim 12, wherein
the memory stores maximum flow rate information that indicates a maximum flow rate of a heat medium that flows through each of the plurality of indoor units, and
the capability computing unit is configured to acquire the maximum flow rate of each of the plurality of indoor units from the maximum flow rate information and calculate a proportion of the flow rate to the maximum flow rate as the exhibited capability value.

16. The air-conditioning system of claim 12, wherein
the operation processing unit is configured to calculate a first pressure loss based on a pressure loss in an outward path of the heat medium circuit and a second pressure loss based on a pressure loss in an outward path of the refrigerant circuit, and
in a case where the exhibited capability value of the maximum load indoor unit is less than the determining capability value, the operation processing unit is configured to reduce the rotation frequency of the pump when the first pressure loss is larger than the second pressure loss or reduce the rotation frequency of the compressor when the first pressure loss is smaller than the second pressure loss.

17. The air-conditioning system of claim 12, wherein
the memory stores a difference allowable range that is a range that allows the compressor to maintain the rotation frequency and that allows the pump to maintain the rotation frequency,
the operation processing unit is configured to
calculate a first pressure loss based on a pressure loss in an outward path of the heat medium circuit and a second pressure loss based on a pressure loss in an outward path of the refrigerant circuit and
calculate a difference value by subtracting the second pressure loss from the first pressure loss, and
in a case where the exhibited capability value of the maximum load indoor unit is less than the determining capability value, the operation processing unit is configured to reduce the rotation frequency of the pump when the difference value is larger than an upper limit value of the difference allowable range or reduce the rotation frequency of the compressor when the difference value is smaller than a lower limit value of the difference allowable range.

18. The air-conditioning system of claim 16, wherein:
the relay device includes:
a relaying expansion device provided between the heat-source-side heat exchanger and the intermediate heat exchanger in the refrigerant circuit and configured to expand refrigerant under reduced pressure,
a pump outlet pressure sensor configured to measure a pump outlet pressure that is a pressure at an outlet of the pump, and
a liquid pipe pressure sensor provided opposite the intermediate heat exchanger across the relaying expansion device and configured to measure a liquid pipe pressure that is a pressure of refrigerant that flows through the refrigerant pipe,
each of the plurality of indoor units includes a valve inlet pressure sensor configured to measure a valve inlet pressure that is a pressure at an inlet of the flow control valve,
the heat-source device includes a discharge pressure sensor configured to measure a discharge pressure that is a pressure of refrigerant that is discharged from the compressor, and
the operation processing unit is configured to
calculate a pressure loss in an outward path of the heat medium circuit from a differential pressure between the pump outlet pressure measured by the pump outlet pressure sensor and the valve inlet pressure measured by the valve inlet pressure sensor and
calculate a pressure loss in an outward path of the refrigerant circuit from a differential pressure between the discharge pressure measured by the discharge pressure sensor and the liquid pipe pressure measured by the liquid pipe pressure sensor.

19. An air-conditioning control method of an air-conditioning system that includes:
- a refrigerant circuit, formed by a compressor, a heat-source-side heat exchanger, and an intermediate heat exchanger that are connected to one another via a refrigerant pipe, through which refrigerant circulates;
- a heat medium circuit, formed by a pump, the intermediate heat exchanger, and a plurality of load-side heat exchangers that are connected to one another via a heat medium pipe, through which a heat medium circulates; and
- a controller, the air-conditioning control method, comprising:
- a flow rate detecting step of detecting flow rate information associated with a flow rate of a heat medium that flows through each of the plurality of load-side heat exchangers; and
- a controlling step, implemented by the controller, of controlling operation of at least either the compressor or the pump on a basis of the flow rate information associated with each of the plurality of load-side heat exchangers and detected in the flow rate detecting step, wherein the controlling step further includes:
- storing a determining capability value used as a criterion for determining a rotation frequency of at least either the compressor or the pump,
- calculating, on a basis of the flow rate information, an exhibited capability value that indicates a capability exhibited by each of the plurality of load-side heat exchangers,
- calculating a load using the exhibited capability value for each of the plurality of load-side heat exchangers,
- selecting, as a maximum load-side heat exchanger, a load-side heat exchanger with a highest load of the plurality load-side heat exchangers, and
- reducing the rotation frequency of at least either the compressor or the pump in a case where the exhibited capability value of the maximum load indoor unit is less than the determining capability value.

* * * * *